(12) United States Patent
Watfa et al.

(10) Patent No.: US 11,689,979 B2
(45) Date of Patent: *Jun. 27, 2023

(54) METHODS, APPARATUS, AND SYSTEMS USING ENHANCED DEDICATED CORE NETWORK (DCN) SELECTION

(71) Applicant: InterDigital Patent Holdings, Inc., Wilmington, DE (US)

(72) Inventors: Mahmoud Watfa, Saint Leonard (CA); Behrouz Aghili, Commack, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,270

(22) Filed: Jun. 9, 2021

(65) Prior Publication Data

US 2021/0297914 A1 Sep. 23, 2021

Related U.S. Application Data

(63) Continuation of application No. 16/866,097, filed on May 4, 2020, now Pat. No. 11,071,031, which is a continuation of application No. 15/770,936, filed as application No. PCT/US2016/059640 on Oct. 31, 2016, now Pat. No. 10,667,190.

(60) Provisional application No. 62/252,117, filed on Nov. 6, 2015.

(51) Int. Cl.
*H04W 36/38* (2009.01)
*H04W 36/12* (2009.01)

(52) U.S. Cl.
CPC ......... *H04W 36/12* (2013.01); *H04W 36/385* (2013.01)

(58) Field of Classification Search
CPC ................................................ H04W 36/12
See application file for complete search history.

(56) References Cited

U.S. PATENT DOCUMENTS

| 7,099,327 | B1 | 8/2006 | Nagarajan et al. |
| 9,930,517 | B2 | 3/2018 | Chen |
| 10,667,190 | B2 | 5/2020 | Watfa et al. |
| 11,071,031 | B2 | 7/2021 | Watfa et al. |

(Continued)

FOREIGN PATENT DOCUMENTS

| CN | 102461234 A | 5/2012 |
| CN | 103858517 A | 6/2014 |

(Continued)

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 14)", 3GPP TS 36.413 V14.0.0, Sep. 2016, 333 pages.

(Continued)

*Primary Examiner* — Michael T Vu
(74) *Attorney, Agent, or Firm* — Majid Albassam

(57) ABSTRACT

Methods, apparatus and systems using Enhanced Dedicated Core Network (DCN) selection are disclosed. One representative method includes receiving, by the core network entity from another core network entity, information indicating that a DCN type is new or has change for a wireless transmit/receive unit (WTRU); and sending a message, by the core network entity to the WTRU, including a new or a changed DCN type.

18 Claims, 16 Drawing Sheets

(56) References Cited

U.S. PATENT DOCUMENTS

| | | | |
|---|---|---|---|
| 2011/0294523 A1 | 12/2011 | Ai et al. | |
| 2012/0099578 A1 | 4/2012 | Aramoto et al. | |
| 2013/0201823 A1 | 8/2013 | Gupta | |
| 2013/0215742 A1 | 8/2013 | Sirotkin et al. | |
| 2014/0051443 A1* | 2/2014 | Diachina | H04W 36/0022 455/436 |
| 2014/0211728 A1 | 7/2014 | Zembutsu et al. | |
| 2015/0223197 A1 | 8/2015 | Kim et al. | |
| 2016/0073314 A1* | 3/2016 | Yang | H04W 36/0022 370/331 |
| 2016/0174120 A1 | 6/2016 | Zembutsu et al. | |
| 2016/0227457 A1 | 8/2016 | Tanaka et al. | |
| 2016/0249278 A1 | 8/2016 | Qi et al. | |
| 2017/0188280 A1 | 6/2017 | Watfa et al. | |
| 2018/0279174 A1 | 9/2018 | Yannick et al. | |

FOREIGN PATENT DOCUMENTS

| | | |
|---|---|---|
| CN | 104871600 A | 8/2015 |
| CN | 106664627 A | 5/2017 |
| WO | WO 2015002290 A1 | 1/2015 |
| WO | WO 2015003753 A1 | 1/2015 |
| WO | WO 2015037650 A1 | 3/2015 |
| WO | WO 2015062098 A1 | 5/2015 |
| WO | WO 2015066383 A1 | 5/2015 |
| WO | WO 2015172088 A1 | 11/2015 |
| WO | WO 2016024848 A1 | 2/2016 |
| WO | WO 2016113083 A1 | 7/2016 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.6.0, Jun. 2015, 302 pages.

Interdigital, "HSS Initiated update for Dedicated CN Information/ Redirection", 3GPP Tdoc S2-160524; 3GPP SA WG2 Meeting #113; Saint Kitts, KN, Jan. 25-29, 2016, 5 pages.

Huawei et al., "UE Slice Association/Overload control Procedure", 3GPP Tdoc S2-162605; 3GPP TSG SA WG2 Meeting #115, Nanjing, China, May 23-27, 2016, 8 pages.

Alcatel-Lucent et al., "UE Usage Type in Handovers", 3GPP Tdoc S2-153234, SA WG2 Meeting #111, Chengdu, P.R. China, Oct. 19-23, 2015, 4 pages.

"3rd Generation Partnership Project; Technical Specification Group Services and System Aspects; Architecture Enhancements for Dedicated Core Networks; Stage 2 (Release 13)", 3GPP TR 23.707 V13.0.0, Dec. 2014, 39 pages.

Ericsson, "Selection of DCN", 3GPP Tdoc S2-153682, SA WG2 Meeting #111, Oct. 19-23, 2015, Chengdu, P.R. China, 5 pages.

"3rd Generation Partnership Project; Technical Specification Group Radio Access Network; Evolved Universal Terrestrial Radio Access Network (E-UTRAN); S1 Application Protocol (S1AP) (Release)", 3GPP TS 36.413 V13.4.0, Sep. 2016, 333 pages.

Interdigital, "Editorial Update to Solution 7 of Key Issue 1 with 'DCN-ID'", 3GPP Tdoc S2-162716; 3GPP SA WG2 Meeting #115; Nanjing, P.R. China, May 23-27, 2016, 4 pages.

Huawei et al., "Solution for enhanced dedicated core network selection", 3GPP Tdoc S2-153307; SA WG2 Meeting #111; Chengdu, China, Oct. 19-23, 2015, 8 pages.

"3rd Generation Partnership Project; Technical Specification Group Radio Access Network; Evolved Universal Terrestrial Radio Access Network (E-UTRAN); S1 Application Protocol (S1AP) (Release 13)", 3GPP TS 36.413 V13.0.0, Jun. 2015, 302 pages.

SA WG2, "New SID on FS on Enhancements of Dedicated Core Networks selection mechanism (FS_eDecor)", 3GPP TDoc SP-150518; 3GPP TSG SA Meeting #69; Phoenix, Arizona, USA, Sep. 15-17, 2015, 5 pages.

Interdigital, "HSS Initiated update for Dedicated CN Information/ Redirection", 3GPP Tdoc S2-153965; 3GPP SA WG2 Meeting #112; Anaheim, California, USA, Nov. 16-20, 2015, 5 pages.

"3rd Generation Partnership Project; Technical Specification Group Services and System Aspects; Enhancements of Dedicated Core Networks selection mechanism; (Release 14)", 3GPP TR 23.711 V0.3.0, Jan. 2016, 31 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.4.0, Sep. 2015, 334 pages.

Samsung, "Discussion on the issues of Décor", 3GPP Tdoc R3-152026, 3GPP TSG RAN WG3 #89bis, Oct. 5-9, 2015, Sophia Antipolis, France, 5 pages.

NEC, "Dedicated Core Network (DCN) selection based on UE's indication to RAN", 3GPP Tdoc S2-153211, SA WG2 Meeting #111, Oct. 19-23, 2015, Chengdu, P. R. China, 3 pages.

* cited by examiner

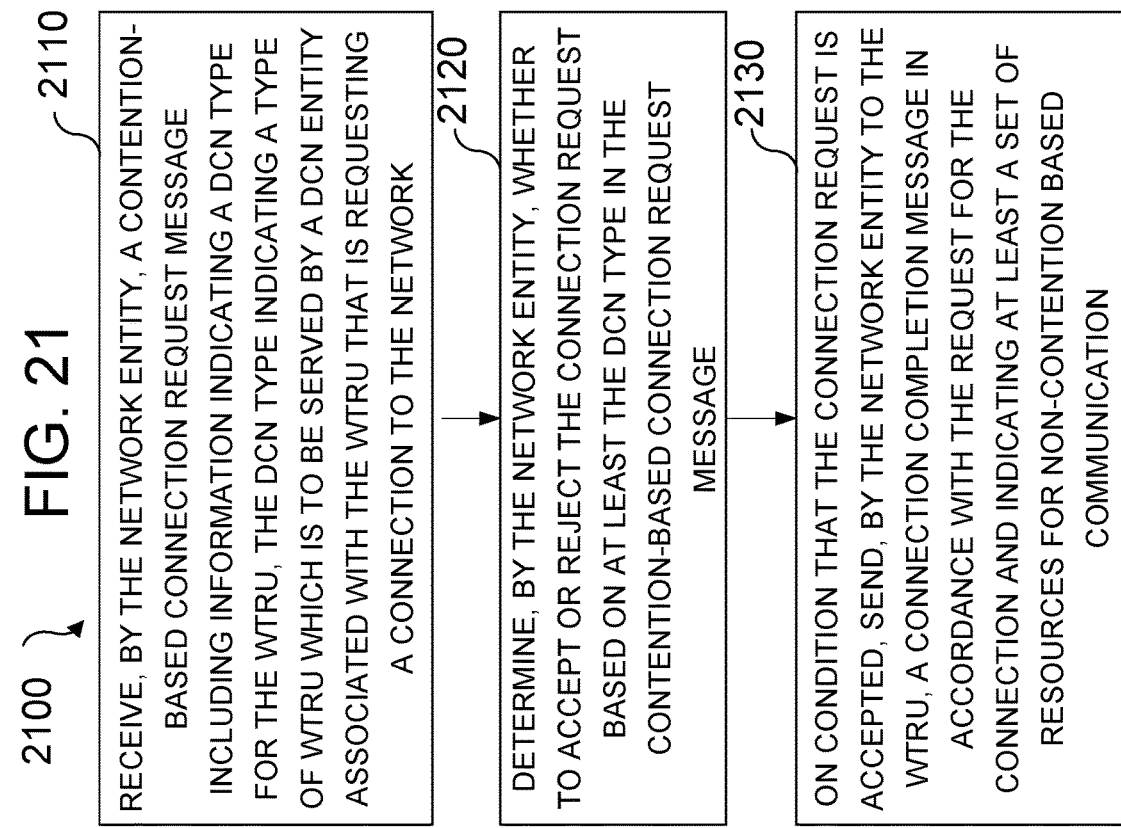
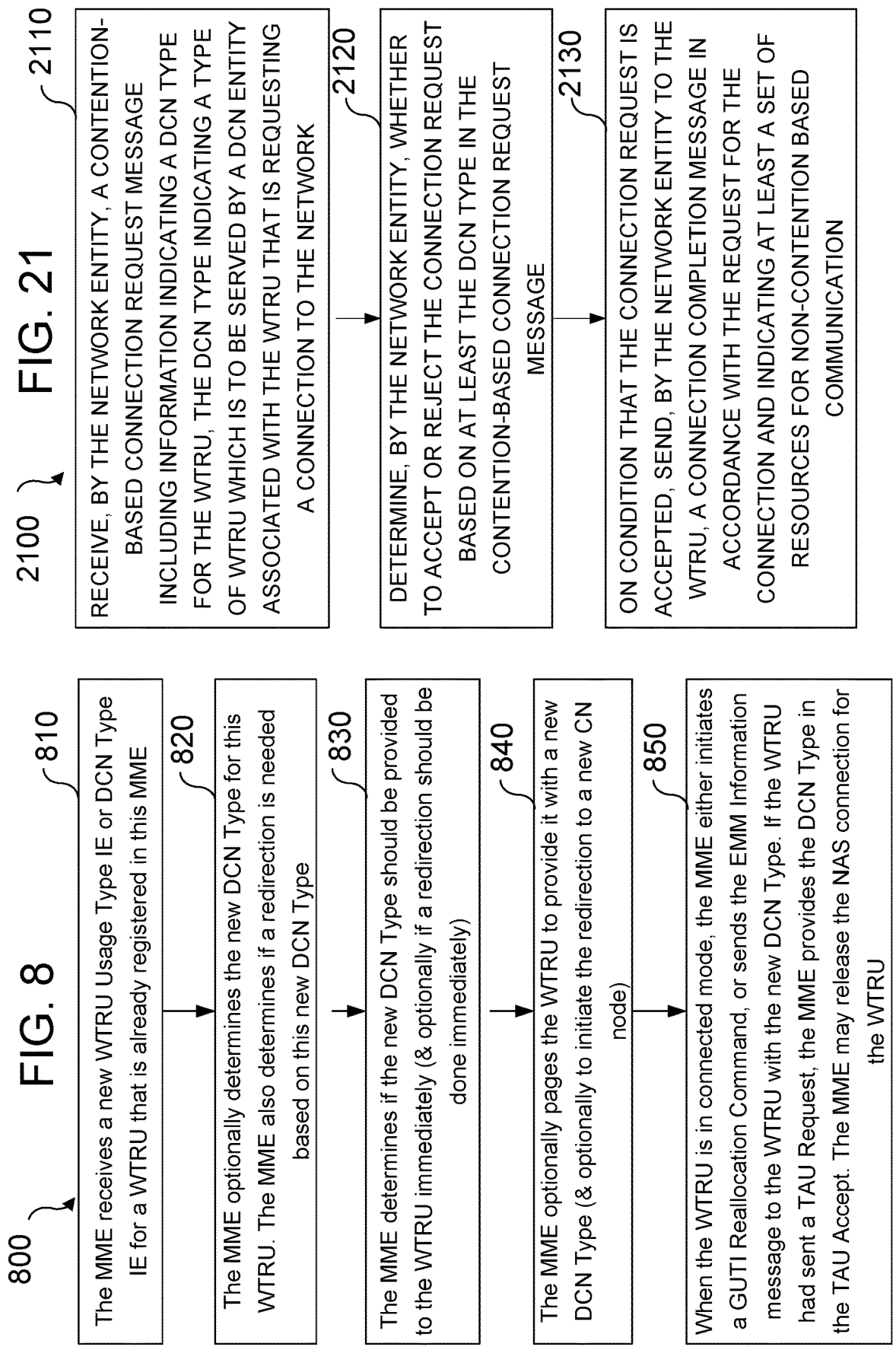

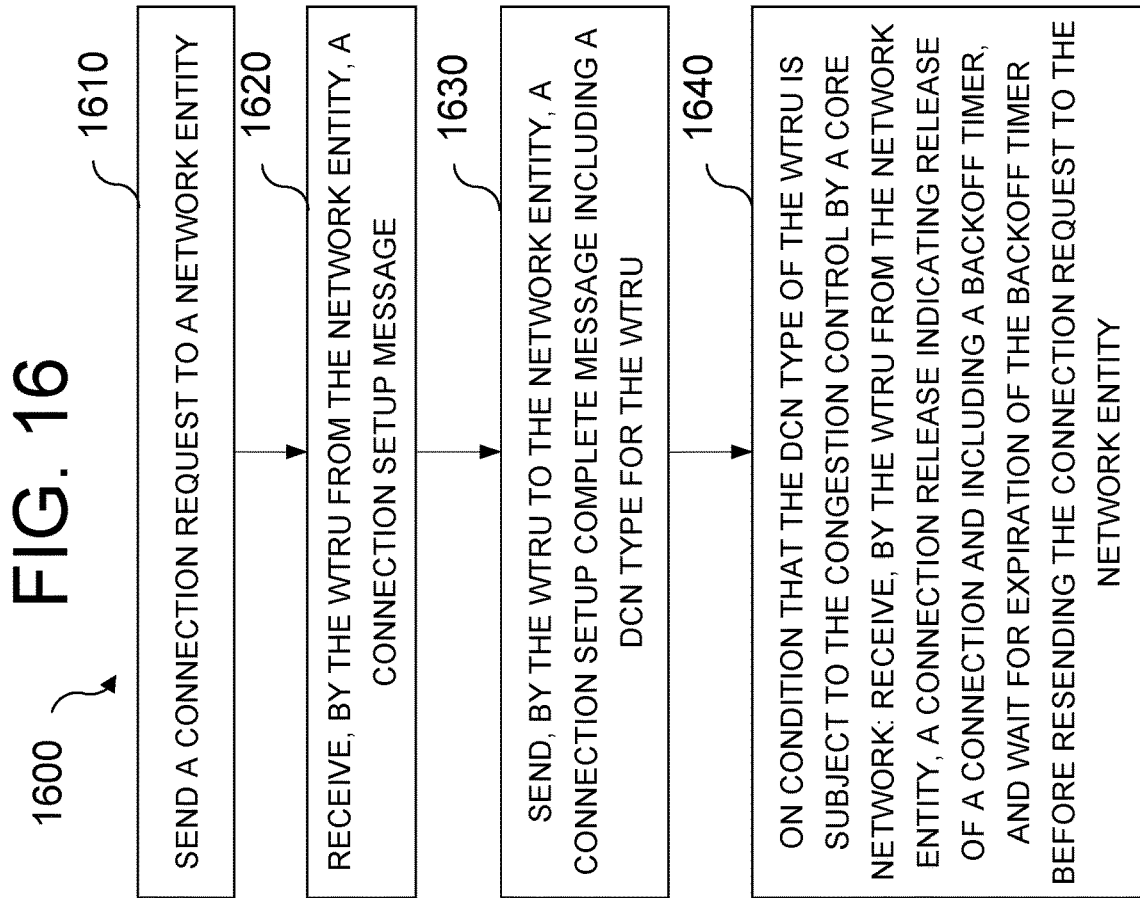

FIG. 16

1600
- 1610 SEND A CONNECTION REQUEST TO A NETWORK ENTITY
- 1620 RECEIVE, BY THE WTRU FROM THE NETWORK ENTITY, A CONNECTION SETUP MESSAGE
- 1630 SEND, BY THE WTRU TO THE NETWORK ENTITY, A CONNECTION SETUP COMPLETE MESSAGE INCLUDING A DCN TYPE FOR THE WTRU
- 1640 ON CONDITION THAT THE DCN TYPE OF THE WTRU IS SUBJECT TO THE CONGESTION CONTROL BY A CORE NETWORK: RECEIVE, BY THE WTRU FROM THE NETWORK ENTITY, A CONNECTION RELEASE INDICATING RELEASE OF A CONNECTION AND INCLUDING A BACKOFF TIMER, AND WAIT FOR EXPIRATION OF THE BACKOFF TIMER BEFORE RESENDING THE CONNECTION REQUEST TO THE NETWORK ENTITY

FIG. 17

1700
- 1710 RECEIVE, BY THE NETWORK ENTITY OR CORE NETWORK ENTITY, A DCN TYPE FOR A WTRU WITH A CONNECTION REQUEST FROM THE WTRU
- 1720 DETERMINE, BY THE NETWORK ENTITY OR CORE NETWORK ENTITY, WHETHER THE CORE NETWORK ENTITY OR ANOTHER CORE NETWORK ENTITY THAT SERVES THE DCN TYPE OF THE WTRU IS CONGESTED, AS A DETERMINED RESULT
- 1730 RESPONSIVE TO THE DETERMINED RESULT, SEND INFORMATION INDICATING ACCEPTANCE OR REJECTION OF THE CONNECTION REQUEST

1810 — SEND, BY THE WTRU TO A NETWORK ENTITY, A CONTENTION-BASED CONNECTION REQUEST MESSAGE INCLUDING INFORMATION INDICATING A DCN TYPE FOR THE WTRU, THE DCN TYPE INDICATING A TYPE OF WTRU WHICH IS TO BE SERVED BY A DCN ENTITY ASSOCIATED WITH THE WTRU THAT IS REQUESTING A CONNECTION TO A NETWORK

1820 — RECEIVE, BY THE WTRU FROM THE NETWORK ENTITY, A CONNECTION COMPLETION MESSAGE IN ACCORDANCE WITH THE REQUEST FOR THE CONNECTION TO THE NETWORK AND INDICATING AT LEAST A SET OF RESOURCE FOR NON-CONTENTION BASED COMMUNICATION

1910 — RECEIVE, BY THE WTRU, A BROADCAST MESSAGE INCLUDING AN INDICATOR INDICATING WHETHER OR NOT THE NETWORK SUPPORTS DCN TYPE MESSAGES

1920 — DETERMINE WHETHER TO SEND A CONTENTION-BASED CONNECTION REQUEST MESSAGE THAT INCLUDES THE DCN TYPE BASED ON THE INDICATOR IN THE BROADCAST MESSAGE

1930 — SEND, BY THE WTRU TO A NETWORK ENTITY, A FIRST CONTENTION-BASED CONNECTION REQUEST MESSAGE WHICH DOES NOT INCLUDE A DCN TYPE ON CONDITION THAT THE NETWORK DOES NOT SUPPORT DCN TYPE MESSAGES OR A SECOND CONTENTION-BASED CONNECTION REQUEST MESSAGE WHICH DOES INCLUDE A DCN TYPE ON CONDITION THAT THE NETWORK DOES SUPPORT DCN TYPE MESSAGES

2210 — RECEIVE, BY THE NETWORK ENTITY (NE) FROM A WTRU, A DCN TYPE FOR THE WTRU WITH A CONNECTION REQUEST

↓

2220 — DETERMINE, BY THE NE, WHETHER TO BLOCK THE WTRU FROM CONNECTING TO A CORE NE THAT SERVES THE DCN TYPE OF THE WTRU, AS A DETERMINED RESULT

↓

2230 — RESPONSIVE TO THE DETERMINED RESULT, SEND INFORMATION INDICATING ACCEPTANCE OR REJECTION OF THE CONNECTION REQUEST

2010 — RECEIVE, BY THE NETWORK ENTITY (NE) FROM A WTRU, A CONTENTION-BASED CONNECTION REQUEST (CR) MESSAGE INCLUDING INFORMATION INDICATING A DCN TYPE FOR THE WTRU, THE DCN TYPE INDICATING A TYPE OF WTRU WHICH IS TO BE SERVED BY A DCN ENTITY ASSOCIATED WITH THE WTRU THAT IS REQUESTING A CONNECTION TO THE NETWORK

↓

2020 — DETERMINE, BY THE NE, WHETHER TO ACCEPT OR REJECT THE CR BASED ON AT LEAST THE DCN TYPE IN THE CONTENTION-BASED CR MESSAGE

↓

2030 — ON CONDITION THAT THE CR IS ACCEPTED, REDIRECT THE WTRU TO ANOTHER CORE NE THAT SERVES WTRUS OF THE DCN TYPE INCLUDED IN THE RECEIVED CR MESSAGE

↓

2040 — ON CONDITION THAT THE CR IS REJECTED, SEND, BY THE NE TO THE WTRU, A CONNECTION REJECT MESSAGE AND A BACKOFF TIMER INDICATING A PERIOD OF TIME IN WHICH THE WTRU CANNOT CONNECT TO THE NETWORK SERVED BY THE CORE NE THAT IS ASSOCIATED WITH THE DCN TYPE IN THE CR MESSAGE

METHODS, APPARATUS, AND SYSTEMS USING ENHANCED DEDICATED CORE NETWORK (DCN) SELECTION

CROSS REFERENCE TO RELATED APPLICATIONS

This application is a continuation of U.S. application Ser. No. 16/866,097, filed May 4, 2020, which is continuation of U.S. application Ser. No. 15/770,936, filed Apr. 25, 2018, which is a National Stage Application under 35 U.S.C. 371 of International Application No. PCT/US16/59640 filed Oct. 31, 2016, and claims priority from U.S. Provisional Application No. 62/252,117, filed Nov. 6, 2015, the contents of each of which are incorporated herein by reference.

FIELD

The present invention relates to the field of wireless communications and, more particularly, to methods, apparatus, systems, using enhanced DCN selection.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 8 is a block diagram illustrating a representative MME behavior associated with redirection to a new CN node;

FIG. 16 is a flowchart illustrating another representative method implemented by a WTRU;

FIG. 17 is a flowchart illustrating a further representative method implemented by a network or CN entity;

FIG. 18 is a flowchart illustrating a further representative method implemented by a WTRU;

FIG. 19 is a flowchart illustrating an additional representative method implemented by a WTRU;

FIG. 20 is a flowchart illustrating an additional representative method implemented by a network entity;

FIG. 21 is a flowchart illustrating a further representative method implemented by a network entity; and FIG. 22 is a flowchart illustrating a still further representative method implemented by a network entity.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1:
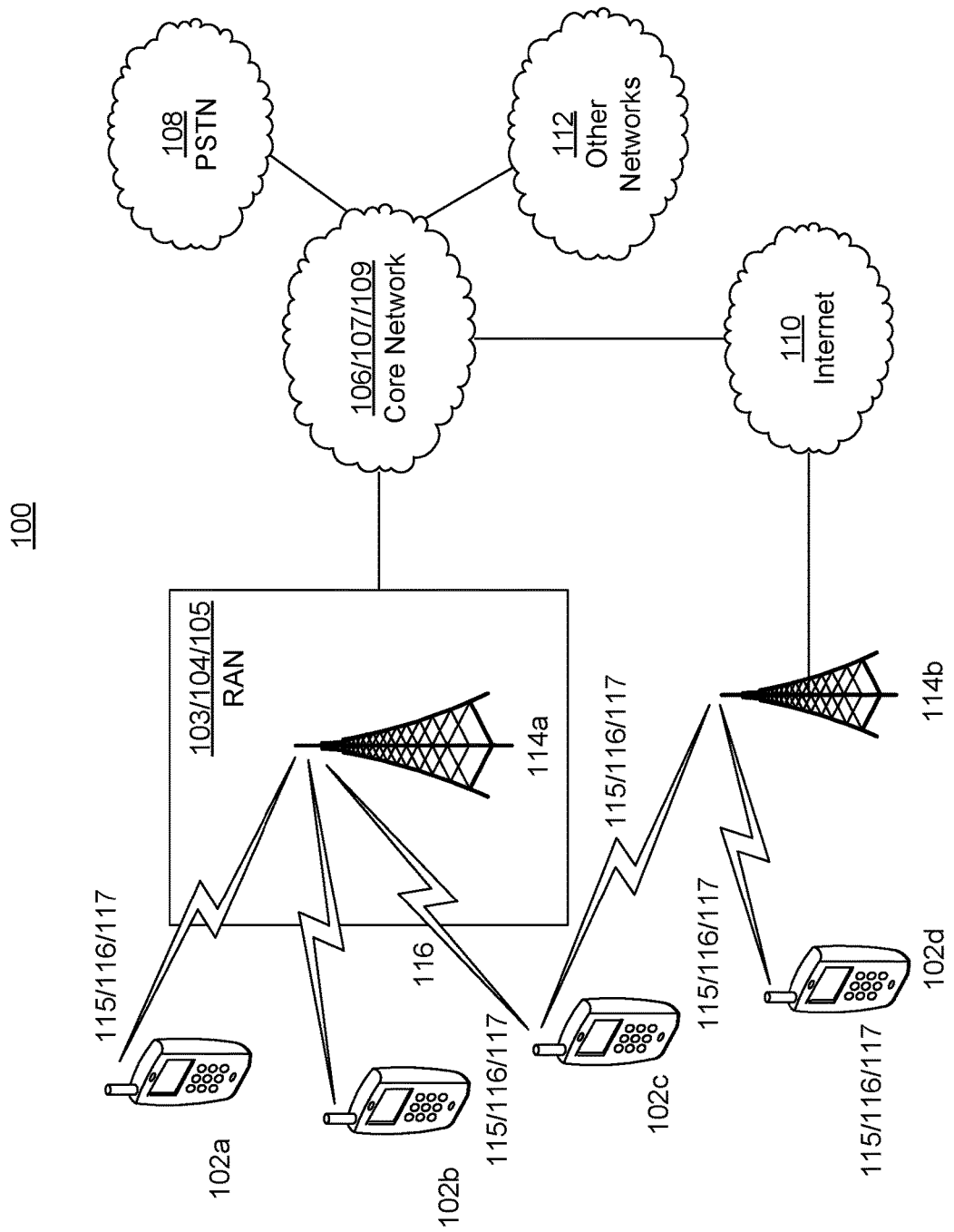
FIG. 1 is a system diagram illustrating an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include wireless transmit/receive units (WTRUs) 102a, 102b, 102c, 102d, a radio access network (RAN) 104, a CN 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The WTRU 102a, 102b, 102c and 102d is interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/107/109, the Internet 110, and/or the other networks 112. By way of example, the base stations 114a, 114b may be a base transceiver station (BTS), a Node-B, an eNode B (also referred to as eNB), a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the CN 106/107/109.

The RAN 103/104/105 may be in communication with the CN 106/107/109, which may be any type of network configured to provide voice, data, applications, and/or voice over internet protocol (VoIP) services to one or more of the WTRUs 102a, 102b, and 102c, 102d. For example, the CN 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the CN 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the CN 106/107/109 may also be in communication with another RAN (not shown) employing a GSM, UMTS, CDMA 2000, WiMAX, or WiFi radio technology.

The CN 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1 may be configured to communicate with the base station 114a, which may employ a cellular-based radio technology, and with the base station 114b, which may employ an IEEE 802 radio technology.

Figure 2:
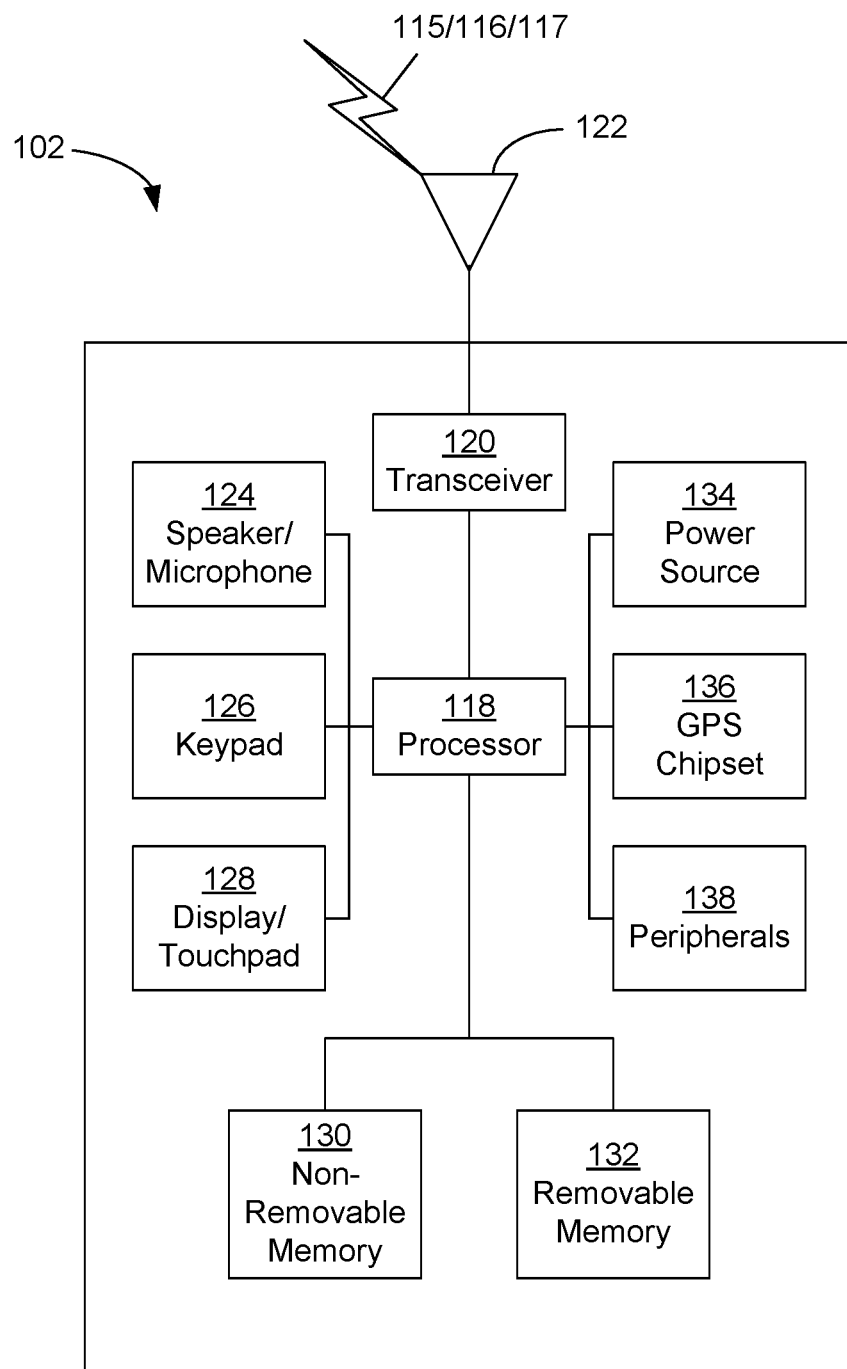
FIG. 2 is a system diagram illustrating an example wireless transmit/receive unit (WTRU) that may be used within the communications system illustrated in FIG. 1.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 3:
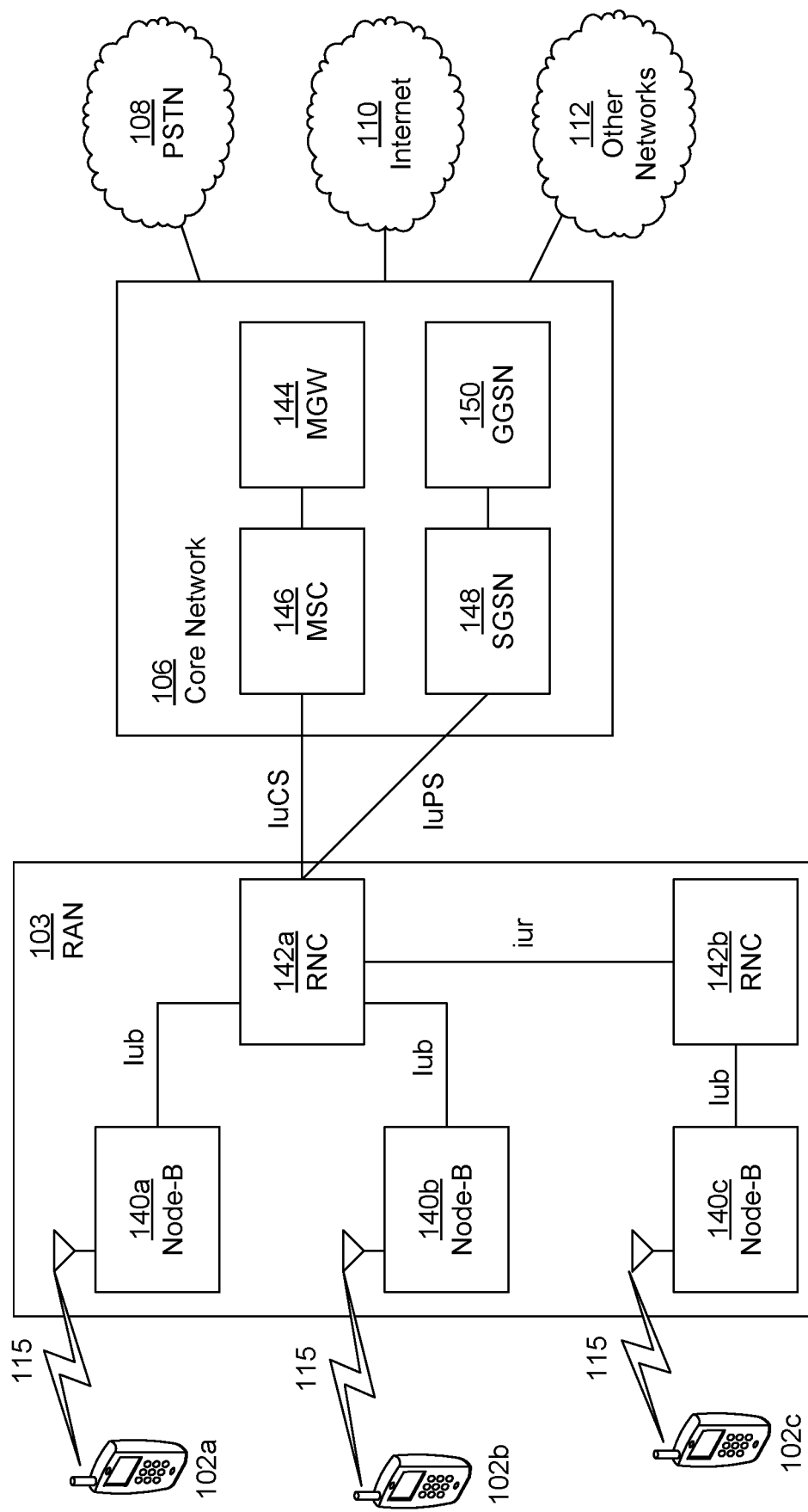
FIG. 3 is a system diagram illustrating an example radio access network and another example Core Network (CN) that may be used within the communications system illustrated in FIG. 1.

FIG. 3 is a system diagram illustrating the RAN 103 and the CN 106 according to another embodiment. As noted above, the RAN 103 may employ a UTRA radio technology to communicate with the WTRUs 102a, 102b, and 102c over the air interface 115. The RAN 103 may also be in communication with the CN 106. As shown in FIG. 3, the RAN 103 may include Node-Bs 140a, 140b, 140c, which may each include one or more transceivers for communicating with the WTRUs 102a, 102b, and 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The CN 106 shown in FIG. 3 may include a media gateway (MGW) 144, a mobile switching center (MSC) 146, a SGSN 148, and/or a gateway GPRS support node (GGSN) 150. While each of the foregoing elements are depicted as part of the CN 106, it will be appreciated that any one of these elements may be owned and/or operated by an entity other than the CN operator.

The RNC 142a in the RAN 103 may be connected to the MSC 146 in the CN 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the CN 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the CN 106 may also be connected to the other networks 112, which may include other wired and/or wireless networks that are owned and/or operated by other service providers.

Figure 4:
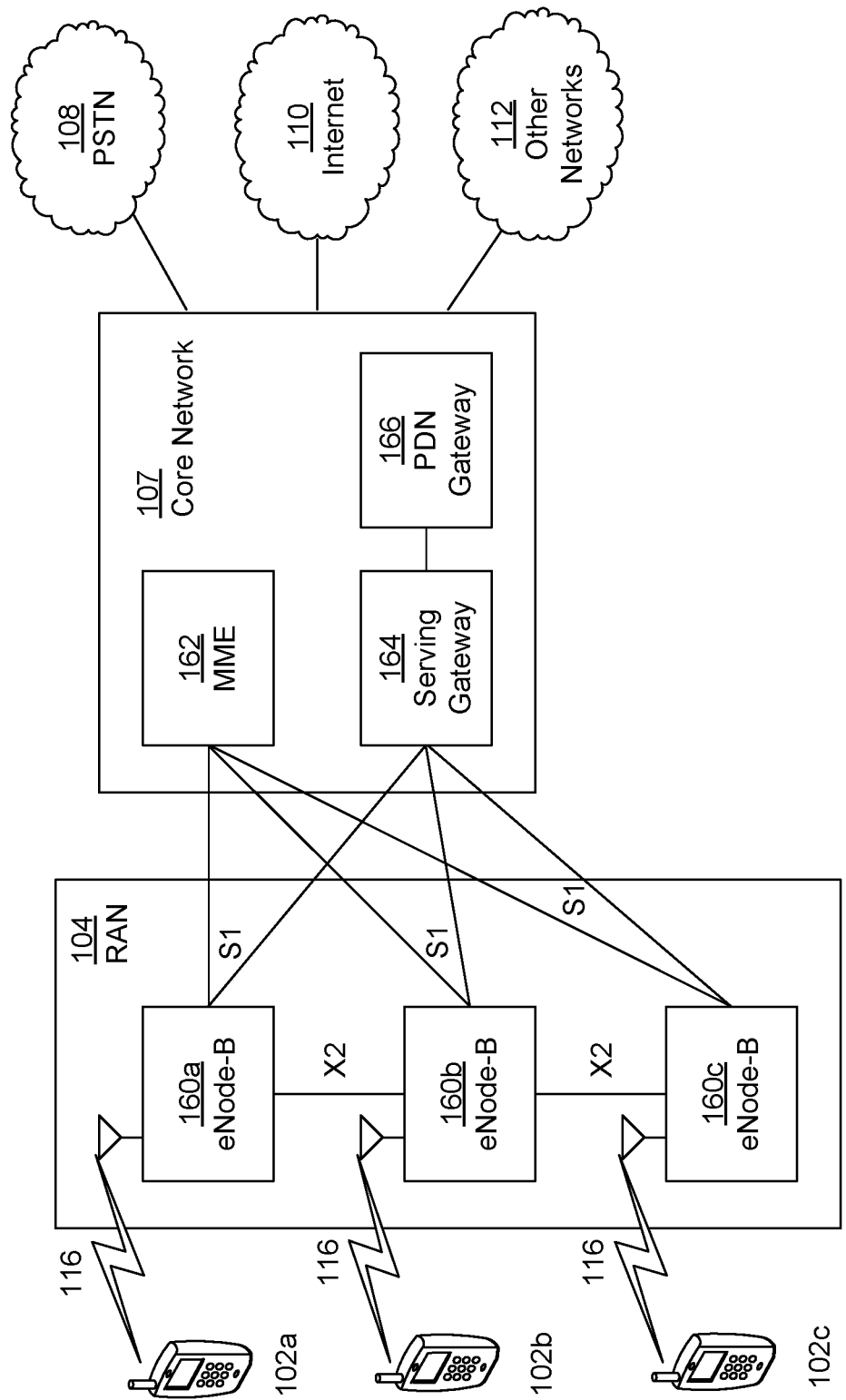
FIG. 4 is a system diagram illustrating another example radio access network and another example CN that may be used within the communications system illustrated in FIG. 1.

FIG. 4 is a system diagram illustrating the RAN 104 and the CN 107 according to an embodiment. As noted above, the RAN 104 may employ an E-UTRA radio technology to communicate with the WTRUs 102a, 102b, and 102c over the air interface 116. The RAN 104 may also be in communication with the CN 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, and 160c may be associated with a particular cell (not shown) and may be configured to handle radio resource management decisions, handover decisions, scheduling of users in the UL and/or DL, and the like. As shown in FIG. 4, the eNode-Bs 160a, 160b, 160c may communicate with one another over an X2 interface.

The CN 107 shown in FIG. 4 may include an MME 162, a serving gateway (SGW) 164, and a packet data network (PDN) gateway (or PGW) 166. While each of the foregoing elements are depicted as part of the CN 107, it will be appreciated that any of these elements may be owned and/or operated by an entity other than the CN operator.

The MME 162 may be connected to each of the eNode-Bs 162a, 162b, and 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 107 may facilitate communications with other networks. For example, the CN 107 may provide the WTRUs 102a, 102b, 102c with access to circuit-switched networks, such as the PSTN 108, to facilitate communications between the WTRUs 102a, 102b, 102c and traditional land-line communications devices. For example, the CN 107 may include, or may communicate with, an IP gateway (e.g., an IP multimedia subsystem (IMS) server) that serves as an interface between the CN 107 and the PSTN 108. In addition, the CN 107 may provide the WTRUs 102a, 102b, 102c with access to the other networks 112, which may include other wired and/or wireless networks that are owned and/or operated by other service providers.

Figure 5:
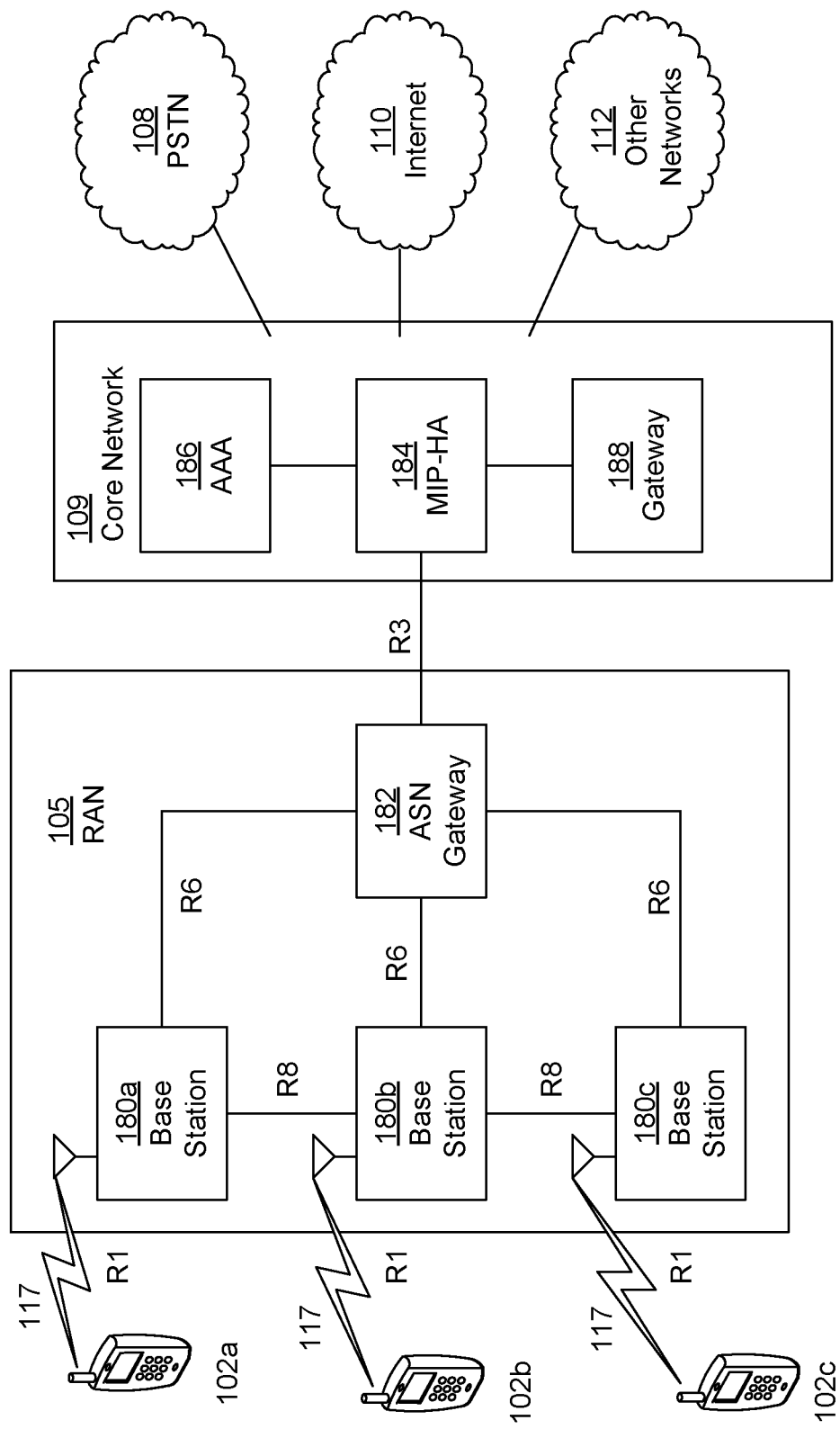
FIG. 5 is a system diagram illustrating a further example radio access network and a further example CN that may be used within the communications system illustrated in FIG. 1.

FIG. 5 is a system diagram illustrating the RAN 105 and the CN 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the CN 109 may be defined as reference points.

As shown in FIG. 5, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. The base station 180a, for example, may use multiple antennas to transmit wireless signals to, and/or receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the CN 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the CN 109. The logical interface between the WTRUs 102a, 102b, 102c and the CN 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 100c.

As shown in FIG. 5, the RAN 105 may be connected to the CN 109. The communication link between the RAN 105 and the CN 109 may be defined as an R3 reference point that includes protocols for facilitating data transfer and mobility management capabilities, for example. The CN 109 may include a mobile IP home agent (MIP-HA) 184, an authentication, authorization, accounting (AAA) server 186, and a gateway 188. While each of the foregoing elements are depicted as part of the CN 109, it will be appreciated that any of these elements may be owned and/or operated by an entity other than the CN operator.

The MIP-HA 184 may be responsible for IP address management, and may enable the WTRUs 102a, 102b, and 102c to roam between different ASNs and/or different CNs. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 5, it will be appreciated that the RAN 105 may be connected to other ASNs, other RANS (e.g., RANs 103 and/or 104) and/or the CN 109 may be connected to other CNs (e.g., CN 106 and/or 107. The communication link between the RAN 105 and the other ASNs may be defined as an R4 reference point, which may include protocols for coordinating the mobility of the WTRUs 102a, 102b, 102c between the RAN 105 and the other ASNs. The communication link between the CN 109 and the other CNs may be defined as an R5 reference, which may include protocols for facilitating interworking between home CNs and visited CNs.

Although the WTRU is described in FIGS. 1-5 as a wireless terminal, it is contemplated that in certain representative embodiments that such a terminal may use (e.g., temporarily or permanently) wired communication interfaces with the communication network.

The terms "core network" (CN) and dedicated CN (DCN) may generally be used interchangeably. In general a DCN may serve particular types of WTRUs, for example, WTRUs associated with one or more DCN types (e.g., only the WTRUs associated with one or more DCN types) and a CN may or may not serve WTRUs with those particular DCN types. For example, the DCN may be a CN that is dedicated to serving one or more types of WTRUs (e.g., WTRUs with certain DCN types).

In certain representative embodiments, when the DCN Type for a certain WTRU changes, (e.g., based on subscription change), the CN node may notify the WTRU of the new DCN Type via modified NAS messages.

In certain representative embodiments, if a redirection is appropriate or needed, the CN node may provide the new DCN Type to the UE, or may provide the new DCN Type to the RAN, for example, so that the RAN can notify the new CN node, which in turn, can notify the WTRU in NAS (e.g., Accept) messages.

In certain representative embodiments, in case of congestion at the DCN, the RRC Connections for one or more DCN Types may be rejected and the WTRU (e.g., device) may receive a Backoff Timer, from the RAN, which will prevent it from accessing the network for the duration of Backoff Timer.

In certain representative embodiments, a new RRC message may be implemented when the WTRU cannot send its DCN Type in the Request message (e.g., an RRC connection Request message).

In certain representative embodiments, the network's support level for the new message and mechanism may be either broadcast or conveyed to the WTRU by RRC messages and/or NAS messages.

In certain representative embodiments, the blockage of WTRU access may be based on (or relaxed based on) any combination of: (1) the DCN Type; (2) the Establishment Causes; and/or priority rules.

There are a variety of services and applications that can be run over cellular networks (for example 3GPP cellular networks). The most common service may be voice, and IP connectivity is increasing and may be one of the most used services provided by cellular operators. Smart phones (e.g., WTRUs) may be used by device users (e.g., interactive and/or non-interactive users) and/or humans who interact with the devices that in turn and/or in response, for example, (1) execute: procedures (e.g., standards based procedures such as 3GPP procedures and/or non-standards based procedures); (2) request an IP address; and/or (3) request resources (e.g., with a specific Quality of Service (QoS)), among others. Other cellular capable device may not be able to be interacted with by device users and/or humans. These devices may be running/executing applications for managing, controlling, and/or communicating with smart meter and/or sensors, among others. Such devices may be referred to as Machine Type (MT) devices and may typically exchange IP data with an application server that may be via the Internet. It is contemplated that a cellular operator may have an increasing amount of MT devices communicating over its network, which may increase load on the cellular system.

The cellular operators may deploy dedicated nodes that serve devices that have a specific characteristic (e.g., low memory devices (e.g., below a threshold), low computing power devices (e.g., below a threshold), a low power transmission device (e.g., below a threshold), a particular radio access technology for communications, a particular bandwidth requirement, devices that are known to be MT devices, devices that have a very predictable communication pattern, and/or devices whose IP connection is required (e.g., used) to meet a specific communication model and/or treatment. The cellular operators may implement dedicated nodes to serve these devices such that: (1) smart phones which may be used by humans (interactively by device users) get (e.g., always get) the services expected (e.g., without any concern about load that may arise from an increased deployment of other devices such as machine devices (e.g., MT devices)); and/or (2) no degradation in service quality for the smart phones will arise, for example, due to too many device (e.g., smartphones and/or machine devices) accessing the system at the same time.

For example, devices (e.g., WTRUs/UE) may be directed and/or steered to DCN nodes such as the MME, a Serving Gateway (SGW), and/or a Packet Data Network Gateway (PGW), among others. The redirection of the WTRU may be done based on subscription information which may be stored at a HSS. The MME may download the subscription information from the HSS, for example, when the WTRU registers and/or attaches to the system. WTRUs that are running MT applications and/or that are of low priority may indicate that they are running MT applications and/or are of low priority, may provide such an indication to the network. For example, a low access priority device indication may be signaled by the WTRU to a network entity when the WTRU accesses the network (e.g., system), (e.g., if the WTRU is configured to be a low priority device). The WTRU may signal the indication at the radio (e.g., radio resource control (RRC)) level and/or Non-Access Stratum (NAS) level. The network may use the indication to take certain actions (e.g., measures), for example, to apply congestion control by providing the WTRU with one or more backoff indications and/or timers.

In one example, subscription information may contain or include an indication that the WTRU is to be or may be served by a DCN. It is contemplated that the subscription information may change at any time and the time at which a WTRU may be directed and/or steered towards a specific CN may be at any time, as well (e.g., may be have a defined time). The steering towards a specific CN may take place when any of the following occur: (1) an Attach procedure; (2) Tracking Area Update (TAU) procedure; (3) a Routing Area Update (RAU) procedure; (3) a Service Request procedure; (4) Intra-RAT and/or inter-RAT idle mode mobility procedures; (5) Intra-RAT and/or inter-RAT handover (HO) procedures; (6) Roaming and/or sharing network scenarios, among others.

Figure 6:
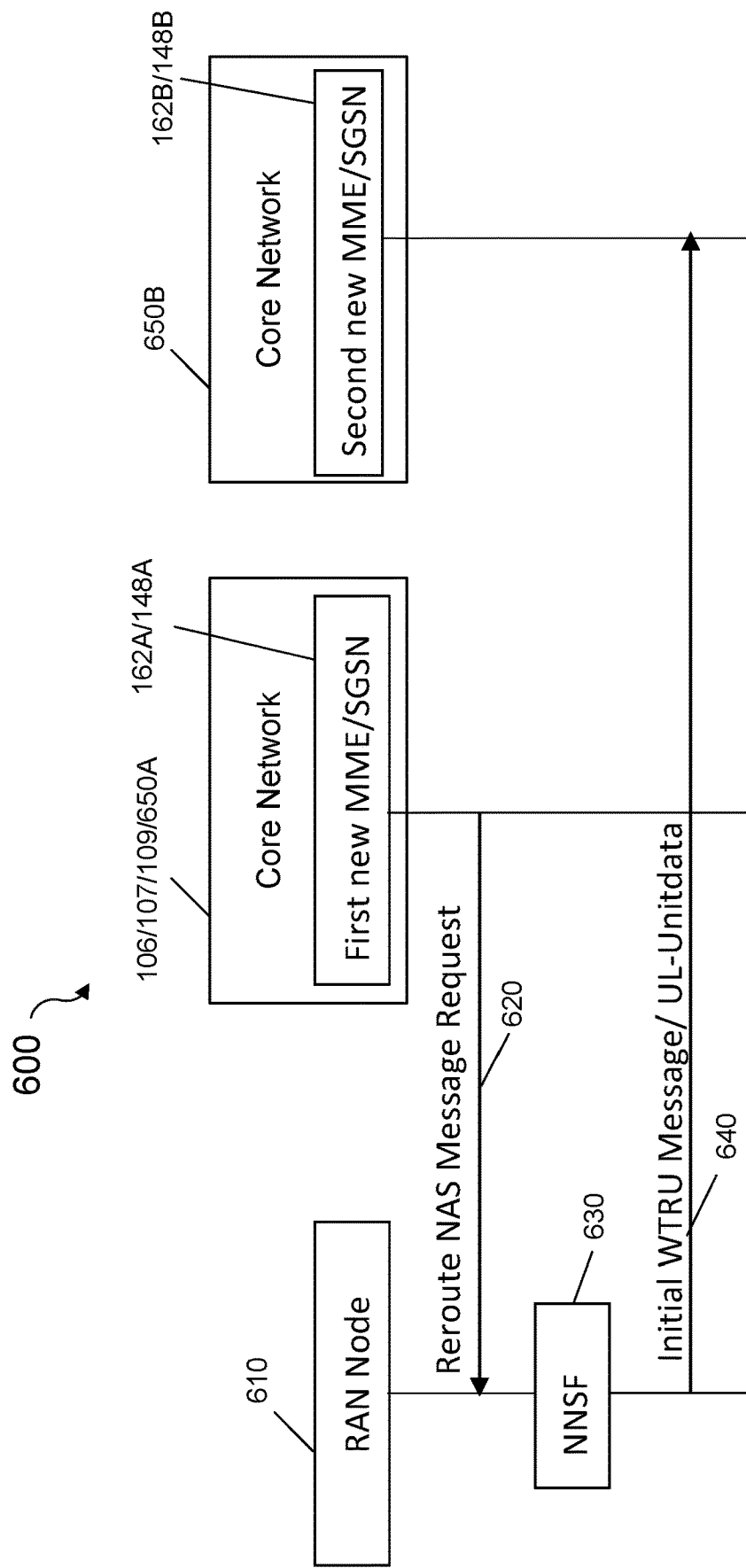
FIG. 6 is a diagram illustrating a Non-Access Stratum (NAS) Message Redirection Procedure.

FIG. 6 is a diagram illustrating a NAS Message Redirection Procedure 600. The NAS Message Redirection Procedure 600 may be implemented, for example, to redirect a WTRU 102 to a dedicated CN. Referring to FIG. 6, at 620, a Reroute Message Request may be sent from a first MME 162A and/or a first SGSN 148A of a CN 106, 107 109 or 650A to a RAN node 610 (e.g., an eNB, a NodeB and/or an access point, among others). At 630, the RAN node 610 may select, using a Node Selection Function (NSF) (e.g., a NAS NSF), a second new MME 162B and/or a second new SGSN 148B of a CN 650B. At 640, the RAN node may send an Initial WTRU Message/UL-Unitdata to the second MME 162B and/or the second SGSN 148B of the CN 650B.

For example, when dedicated CNs (DCNs) 650 are implemented, a NAS message may be used to reroute a WTRU 102 from a first CN node (e.g., the MME 162A and/or the SGSN 148A) to another CN node (e.g., the MME 162B and/or the SGSN 148B) during an Attach procedure, a TAU procedure and/or a RAU procedure. The MME 162/SGSN 148 and/or the HSS 710 may participate in the DCN Reselection Procedure.

The NAS Message Redirection Procedure 600 may be initiated by a network entity (e.g., a new MME 162A/SGSN 148A and/or another network entity associated with a first CN node) on condition that (e.g., when) the network entity (e.g., the new MME 162A/SGSN 148A) decides and/or determines to move handling of an Attach Request, a TAU Request and/or a RAU Request to another CN node (e.g., the MME 162B and/or the SGSN 148B). The NAS Message Redirection Procedure 600 may include any of the following:

1) The first new MME 162A/SGSN 148A may send a Reroute NAS Message Request (including an original RAN message, reroute parameters, and/or Additional Globally Unique Temporary Identity (GUTI)/Packet-Temporary Mobile Subscriber Identity (P-TMSI), among others) to the RAN node 610. The reroute parameter may include a MME Group Identity (MMEGI), for example for E-UTRAN, or Null-Network Resource Identifier (Null-NRI)/SGSN Group ID, for example for UTRAN/GERAN, that may correspond to the DCN that may correspond to or be associated with a WTRU (e.g., UE) Usage Type. A WTRU 102 that is provided with an Additional GUTI/P-TMSI (e.g., if available) from the NAS Request message may be included. The MME 162A may determine the MMEGI or Null-NRI/SGSN Group ID corresponding to the DCN 650B using Domain Name system (DNS) procedures. The original RAN message may be the complete PDU received from the RAN 610, which may contain or may include the original NAS Request message and RAN information elements (IEs) (e.g., one, some or all RAN IEs).

2) The RAN node's NAS Node Selection Function (NNSF) may select a new MME 162/SGSN 148 based on the MMEGI, the Null-NRI/SGSN Group ID, and/or the Additional GUTI/P-TMSI. For example, if the Additional GUTI/P-TMSI identifies the MME 162B/SGSN 148B within a set of valid nodes identified by the MMEGI and/or the Null-NRI/SGSN Group ID, the identified MME 162B/SGSN 148B may be selected (e.g., may be the selected node). In certain examples, a valid CN node corresponding to the MMEGI and/or Null-NRI/SGSN Group ID may be selected. If no valid MME 162/SGSN 148 is available within the set of valid nodes identified by the MMEGI and/or the Null-NRI/SGSN Group ID, the RAN node 610 may select an MME 162/SGSN 148 from a default DCN 650 or may select the MME 162A/SGSN 148A that sent the Reroute Request, based on one or more operator policies, rules and/or configurations. The MME 162/SGSN 148 may be selected from the network corresponding to the selected CN operator.

3) In certain examples, the eNB 160/RNC 142, dependent on the radio access technology (RAT) used, may send the Initial WTRU message to the selected MME 162/SGSN 148 and/or the base station controller (BSC)/access point 140, 160 and/or 180 may send a UL-Unitdata message to the selected SGSN 148 and/or network entity (e.g., the MME 162 and/or other network entities, among others). The initial WTRU message/UL-Unitdata message may include the NAS Request message, the MMEGI and/or the Null-NRI/SGSN Group ID. The MMEGI and/or the Null-NRI/SGSN Group ID may indicate that the message is a rerouted message and the second new MME 162B/SGSN 148B of the DCN 650B may not reroute the NAS message (e.g., to a further CN node).

The following is contemplated regarding the NAS Message Redirection Procedure:

1) There is no WTRU impact from the NAS Message Redirection Procedure (e.g., the steering of a WTRU 102 towards a particular CN 650 (e.g., a DCN) may not be perceived by the WTRU 102 and/or the user of the WTRU 102.

2) The procedure may be based on and/or may use subscription information. A new WTRU Usage Type IE may be defined (e.g., in the HSS 710) for the WTRU 102 and when the MME 162 fetches the WTRU's subscription profile from the HSS 710, the MME 162 may be able to determine, based on the WTRU Usage Type IE, which CN 650 (e.g., DCN) the WTRU 102 may be or should be redirected to (e.g., as appropriate, for example, on the condition that or if the MME 162 is not an appropriate node to serve the WTRU 102). If a redirection is to occur, the MME 162 may trigger the Redirection procedure towards the RAN node 610 (e.g., a particular eNB 160). The MME 162 may include reroute parameters (e.g., the MMEGI in case of LTE, and/or the Null-NRI/SGSN Group ID for a UTRAN/GERAN system) among other parameters. The eNB 160 or RAN node 610 may use the received parameters to select an MME 162 (and/or a CN 650 (e.g., the DCN)).

3) The procedure may be initiated on condition that (e.g., only works when) the WTRU 102 is sending an Attach Request message (e.g., when the WTRU 102 is first (e.g., initially) registering with the network/system) and/or when a TAU Request message is sent e.g., due to periodic registration or idle mode mobility. It is contemplated that a redirection may be triggered based on the reception of a Service Request message from the WTRU 102.

If a WTRU 102 is registered (e.g., already registered) in the network (e.g., the network 100), for example, the WTRU 102 already has a serving CN 106, 107, 109, or 650A, the WTRU's subscription information may change such that a (new) dedicated CN 650B is appropriate and/or required to serve the WTRU 102. With the given procedure, which works (e.g., only works) for particular NAS messages (e.g., Attach Request messages and/or TAU messages), the immediate redirection to a new DCN 650B may not be possible if the WTRU 102 is already registered except when a TAU is sent. A TAU message may be governed by a periodic update timer, which may take a long time (more than a threshold time) to occur.

Figure 7:
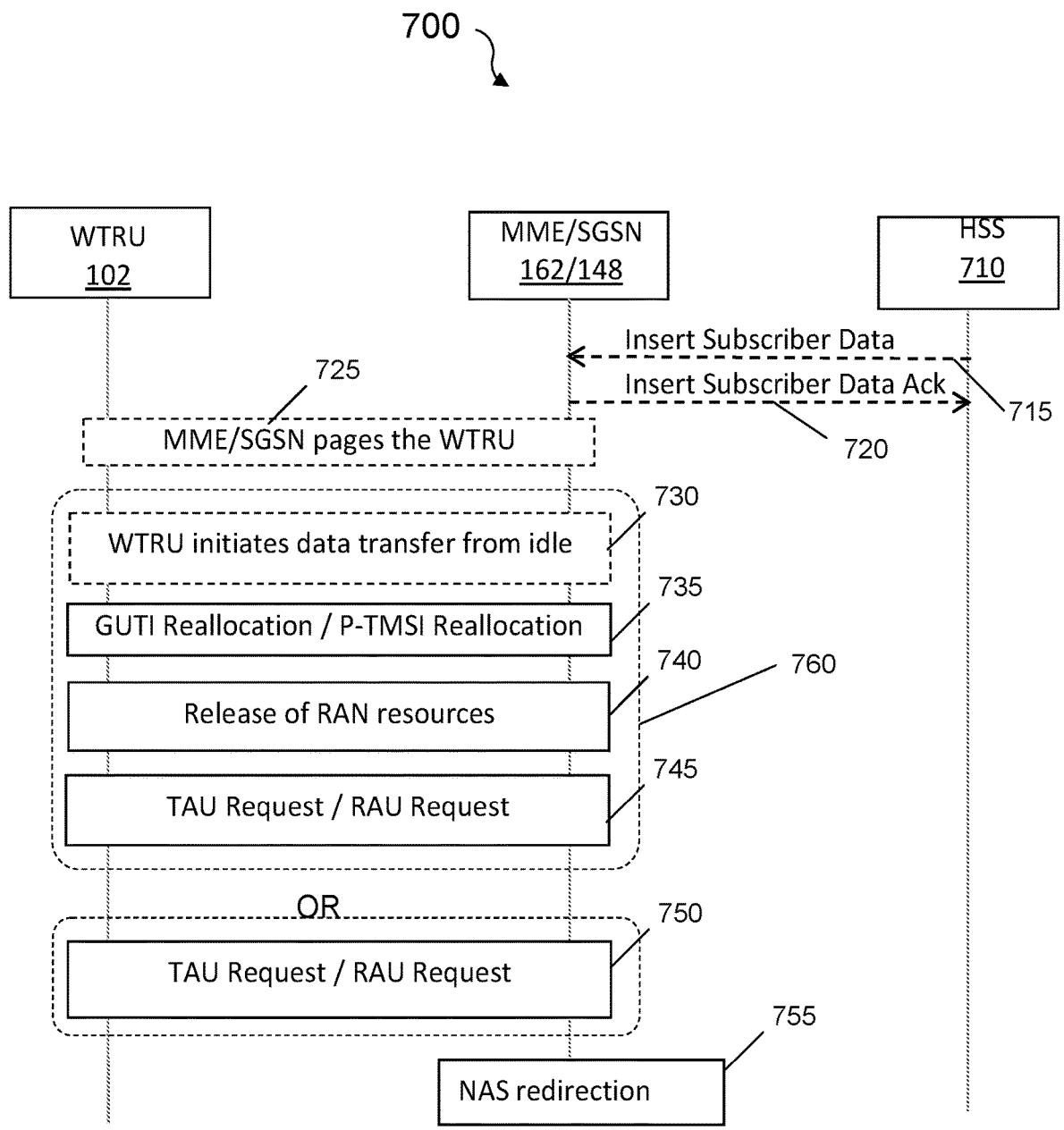
FIG. 7 is a diagram illustrating a Mobility Management Entity (MME)/a serving GPRS support node (SGSN) or a Home Subscriber Server (HSS) Initiated DCN Reselection Procedure.

FIG. 7 is a diagram illustrating a MME/SGSN or HSS Initiated DCN Reselection procedure 700.

Referring to FIG. 7, at 715, a HSS 710 may send an Insert Subscriber Data message to a MME 162 and/or SGSN 148 associated with a WTRU 102. At 720, the MME 162 and/or the SGSN 148 associated with the WTRU 102 may send an Insert Subscriber Data Acknowledgement message to the HSS 710. At 725, the MME 162 and/or the SGSN 148 associated with the WTRU 102 may page the WTRU 102. At 730, the WTRU 102 may initiate data transfer from idle mode with the MME 162 and/or the SGSN 148 associated with the WTRU 102. At 735, the MME 162/SGSN 148 may trigger GUTI Reallocation/P-TMSI Reallocation with the WTRU 102. At 740, the MME 162/SGSN 148 may release RAN resources. At 745 or 750, the WTRU 102 may perform a TAU procedure and/or a RAU procedure. At 755, the MME 162/SGSN 148 may initiate a NAS redirection to a DCN 650. In certain representative embodiments, operations 730, 735, 740 and 745 may be completed or operation 750 may be completed in lieu of operations 730, 735, 740 and 745.

For example, the MME/SGSN or HSS 710 initiated DCN Reselection procedure 700 may be implemented to alleviate one or more concerns associated with the NAS Message Redirection procedure and to speed up the change from the serving CN 106, 107, 109 or 650A to a DCN 650B and may include any of the following:

If DCNs 650 are deployed, the DCN reselection procedure may be used by the HSS 710 to update the WTRU Usage Type subscription parameter in the serving node. The reselection procedure may enable and/or result in a change of serving node of the WTRU 102. The reselection procedure may be used for MME/SGSN initiated serving node change for WTRUs 102 (e.g., when or on condition that a configuration regarding the WTRU Usage Types served by the MME 162/SGSN 148 is changed). The reselection procedure may be used after a handover procedure by the target MME 162/SGSN 148 to redirect the WTRU 102 to a serving node of another DCN (e.g., DCN 650B). The reselection procedure herein may be applied when a handover occurs from a service area where DCNs 650 are not supported (e.g., used) to a service area where the DCNs 650 are supported (e.g., used) and the target CN node does not serve the WTRU Usage type. The handover procedure may complete successfully and the target CN node may use the reselection procedure (associated with representative operations 735 and onwards) to change the serving DCN 650 of the WTRU 102.

The subscription change may be applied to a large number of WTRUs 102 (e.g., above a threshold number of WTRUs) and considerations for MME/SGSN rebalancing as disclosed herein may be applied, for example, to avoid sudden redirection of WTRUs 102 that may overload the CN nodes 144, 146, 148, 150, 162, 164, 166, 184, 186, and 188 (and/or the RAN 103 104 or 105, if paging is appropriate and/or needed).

Representative operations 715 and 720 of FIG. 7 may apply for HSS initiated DCN Reselection procedure (e.g., only the HSS initiated DCN Reselection procedure).

The DCN Reselection procedure 700 may include any of the following:

1) The HSS 710 may send an Insert Subscriber Data Request (IMSI, Subscription Data) message to the MME 162/SGSN 148. The Subscription Data may include WTRU Usage Type information. It is contemplated that when WTRU Usage Type subscription change is to be applied for a large number of subscribers, the HSS 710 may stagger an insertion of the subscription changes to the serving nodes (e.g., based on information/signaling from Operations & Maintenance (OAM).

2) The MME 162/SGSN 148 may update the stored Subscription Data and may acknowledge the Insert Subscriber Data Request message, for example, by returning an Insert Subscriber Data Answer (IMSI) message to the HSS 710. The procedure may end, if the MME 162/SGSN 148 can continue to serve the WTRU 102.

3) If the MME 162/SGSN 148 determines and/or decides to transfer the WTRU 102 immediately (e.g., within a certain threshold period) to another CN (e.g., the DCN 650A or the DCN 650B) and the WTRU 102 is in idle mode, the MME 162/SGSN 148 may page the WTRU 102. In another example, the MME 162 may wait until the WTRU 102 becomes active.

In certain representative embodiments, for the DCN Reselection procedure, either operations associated with 760 (e.g., operations 730, 735, 740 and 745) or operation 750 may occur or may be executed. Operations 730, 735, 740 and 745 may occur when the WTRU 102 is already in connected mode or the WTRU 102 enters connected mode by initiating a data transfer. The operation 750 may occur when the WTRU is in idle mode and performs a TAU procedure and/or a RAU procedure.

4) Triggered by the paging or triggering by uplink data, the WTRU 102 may initiate NAS connection establishment. In some examples, the WTRU 102 may initiate NAS connection establishment by sending a TAU/RAU Request.

5) When a NAS connection already exists or when a NAS connection is established for initiating data transfer, the MME 162/SGSN 148 may trigger a GUTI Reallocation/P-TMSI Reallocation procedure and may include a non-broadcast Tracking Area Identity (TAI)/Routing Area Identification (RAI).

6) The MME 162/SGSN 148 may release RAN resources and/or the WTRU 102 may be moved to idle mode.

It is contemplated that on condition that a large number of WTRUs 102 (e.g., above a threshold number of WTRUs) are to be or need to be offloaded, the MME 162/SGSN 148 may not release RAN resources for the WTRUs 102 (e.g., all of the WTRUs) immediately, e.g., to avoid sudden redirection of the WTRUs 102 that may overload the CN nodes (and/or the RAN, for example, if paging is appropriate or needed). The MME 162/SGSN 148 may wait until the release is performed due to inactivity.

7) The non-broadcast TAI/RAI may trigger the WTRU 102 to start (e.g., immediately start) the TAU/RAU procedure. The MME 162/SGSN 148 may receive the TAU/RAU Request message.

8) The WTRU 102 may perform a TAU/RAU request. The MME 162/SGSN 148 may receive the TAU/RAU Request message.

9) If the WTRU Usage Type for the WTRU 102 is not served by the MME 162/SGSN 148, the MME 162/SGSN 148 may trigger the NAS Message redirection procedure disclosed herein to redirect the WTRU 102. This may be followed by completion of a TAU/RAU procedure at the MME 162 of the selected DCN.

The redirection procedure during an Attach or TAU may cause signaling in the network (e.g., network 100) before the appropriate CN 106, 107, 109, or 650 is selected. At least one redirection procedure is appropriate and/or needed before the correct CN is selected or picked for a WTRU 102. To avoid such signaling, 3GPP Release 13 WTRUs may include functionality/operations/procedures for DCN selection/redirection that are backward compatible to 3GPP Pre-Release 13 WTRUs. In certain representative embodiments, the 3GPP Release 13 WTRUs may provide assistance information as part of the RRC connection establishment. The assistance information may be used by the RAN 103, 104 and/or 105 (e.g., for a RAN node 610 or the eNB 160, among others) to select a CN 106, 107 or 109 without using a CN redirection procedure.

Representative Procedures for Change of DCN Type for the WTRU Based on Subscription Modification/Change In certain representative embodiments, the WTRU 102 may send assistance information to the network, for example, to help choose the correct DCN 650. The assistance information may include an indication (e.g., new indication), for example, which may be a parameter or a DCN Type IE. The WTRU 102 may be pre-configured to indicate a specific DCN Type. There may be a change of subscription for the WTRU 102, which may change the DCN Type at the network side. The HSS 710 may start an operation toward the DCN node (e.g., the MME 162A and/or the SGSN 148A, among others) where the WTRU 102 resides at this point. If the DCN node 162A/148A supports the new DCN Type, the WTRU 102 may not be redirected to another DCN node 162B/148B. The WTRU 102 may be aware that its DCN Type has changed so that the WTRU 102 may indicate the changed DCN Type in the next or a subsequent communication or contact with the network (e.g., network 100).

Representative Procedures for Congestion at the Network Side

At any time, thresholds at the network side (e.g., at the RAN 103, 104 and/or 105, DCN 650A and 650B and/or DCN node 162A/148A and/or 162B/148B, among others) may be reached leading to a determination that the node (e.g., the DCNs) is now congested. The DCN 650 may not wish to or may determine not to have more signaling or data communication. Rules, policies, thresholds and/or criteria may be configured by the operators so that a DCN node 162A/148A and/or 162B/148B may accept one or more DCN Types but may reject other DCN Types. In certain representative embodiments, procedures may be implemented such that a DCN node 162A/148A and/or 162B/148B may not receive signaling messages (e.g., even receive any signaling messages) that originate from WTRUs 102 of a certain DCN type. A congestion control operation applicable to certain DCN types may be desired since one DCN 650A or 650B may serve different DCN Types and one DCN Type may be of lower priority than another DCN Type.

Although the representative procedures set forth herein are described in association with an LTE system, one of skill in the art understands that the representative procedures can be applied to other RATs or other systems such as GERAN/UTRAN with corresponding CN nodes and corresponding RAN nodes and CN/RAN/WTRU procedures at RRC or NAS, etc. As such, the term "MME" may refer to an LTE MME or may also refer to a SGSN, or a C-SGN (e.g., for a Cellular Internet of Things (CioT) and the term "eNB" may refer to an LTE eNB or may also refer to a RNC or a BSC.

Representative Procedure for Notifying the WTRU of a New DCN Type

Representative CN Node Behavior (e.g., MME Behavior)

The CN node (e.g., the MME 162) may receive an indication from the HSS 710 that the WTRU's Usage Type has changed (e.g., the WTRU 102 may be or is to be redirected to another DCN (e.g., the DCN 650B, or the WTRU's DCN has changed). The CN node (e.g., the MME 162) may receive, from the HSS 710, a new DCN Type for the particular WTRU 102. The CN node (e.g., the MME 162) may determine the new DCN Type that the WTRU 102 is to be assigned. The determination of the new DCN Type may be based on local configuration or policies in the CN node (e.g., the MME 162). For example, the CN node (e.g., the MME 162) may be configured with mappings between one or more WTRU Usage Types and one or more DCN Types. If a new WTRU Usage Type is received, from the HSS 710, for the WTRU 102, the CN node 162 may determine the new DCN Type that the WTRU 102 is to be allocated. In certain representative embodiments, the HSS 710 may provide information (e.g., stored information) to the MME 162 to locally configure the change of WTRU Usage Type indication, set the new WTRU Usage Type for the WTRU 102, and/or set the new DCN Type for the WTRU 102.

Once or after a new DCN Type has been determined for the WTRU 102, the CN node (e.g., the MME 162) may determine if a redirection is to be completed (e.g., needed) (as one CN node may serve multiple DCN Types) for the WTRU 102.

Representative CN Node Behavior (e.g., the MME Behavior), for Example if a Redirection is not Appropriate and/or Needed If a redirection is not appropriate and/or needed, the CN node (e.g., the MME 162) may send a new DCN Type to the WTRU 102. The MME 162 may verify if the WTRU 102 is in idle mode or connected mode and may act depending on the verified mode.

If the WTRU 102 is in idle mode, the CN node (e.g., the MME 162) may page (e.g., pro-actively page) the WTRU 102 to bring the WTRU 102 to connected mode (e.g., to control transition of the WTRU 102 to connected mode). In certain representative embodiments, the CN node (e.g., the MME 162) may wait for the WTRU 102 to transition to connected mode. The CN node (e.g., the MME 162) may have local policies from which the CN node 162 may determine actions to be taken. For example, the CN node (e.g., the MME 162) may determine whether paging the WTRU 102 is appropriate (e.g., necessary or not) based on: (1) load conditions; (2) priority of the DCN Type; and/or (3) an indication (for example, received from the HSS 710 and/or locally configured in the CN node 162), for example, about the priority associated with the new DCN Type.

When the WTRU 102 transitions to connected mode (for example, due to or after paging of the WTRU 102 or due to a WTRU initiated NAS signaling connection), the MME 162 may send the new DCN Type to the WTRU 102. The CN node (e.g., the MME 162) may use any of the following to send the new DCN Type.

The CN node (e.g., the MME 162) may use an existing NAS message (e.g., the EPS Mobility Management (EMM) Information message) in an LTE system and/or Mobility Management (MM)/GPRS MM (GMM) Information message) by the MSC 146/SGSN 148) and may include the new DCN Type, as a new DCN Type IE.

In certain representative embodiments, the CN node (e.g., the MME 162) may use the GUTI Reallocation Command message to provide the WTRU 102 with a new DCN Type. The CN node (e.g., the MME 162) may include a new DCN Type IE in the message (e.g., the GUTI Reallocation Command message). The MME 162 may keep the same GUTI for the WTRU 102 or the MME 162 may allocate a new GUTI. The MMEGI may point to the new DCN Type so that the RAN node (e.g., eNB 160) can correctly route the NAS messages to the appropriate CN node 162.

If the WTRU 102 initiates a NAS signaling connection by sending a RAU/TAU message, the CN node (e.g., the MME 162) may provide the WTRU 102 with a new DCN Type in the RAU/TAU message. The MME 162 may include the new DCN Type IE in a message to the WTRU 102 and may include a new IE to indicate whether a redirection to the new DCN is appropriate (e.g., needed or not).

After an allocation of the new DCN Type to the WTRU 102, the CN node (e.g., the MME 162) may release the WTRU's NAS connection (and RRC connection) by initiating a release procedure on the S1AP interface towards the RAN node (e.g., the eNB 160).

Representative CN Node Behavior when a Redirection is Appropriate or Needed

Representative Procedures when the WTRU is in Connected Mode

FIG. 8 is a flow chart illustrating a representative MME behavior 800 associated with redirection to a new CN node. If a redirection is desired, appropriate and/or needed, the MME behavior may depend on whether the WTRU 102 is in connected mode or is not in connected mode.

Referring to FIG. 8, at block 810, the MME 162 may receive a new WTRU Usage Type IE or DCN Type IE for a WTRU 102 that is already registered in the MME 162. At block 820, the MME 162 may determine the new DCN Type for the WTRU 102 and the MME 162 may determine if a redirection is appropriate or needed based on this new DCN Type. At block 830, the MME 162 may determine if the new DCN Type should be or is to be provided to the WTRU 102 immediately. For example, the determination may be optionally initiated if a redirection should be or is to be done immediately. At block 840, the MME 162 may page the WTRU 102 to provide the WTRU 102 with a new DCN Type. In certain representative embodiments, the MME may page the WTRU to initiate the redirection to a new CN node (e.g., the MME 162A or 162B). When the WTRU 102 is in connected mode, the MME 162 may initiate a GUTI Reallocation Command, and/or may send the EMM Information message to the WTRU 102 with the new DCN Type. If the WTRU 102 had sent a TAU Request, the MME 162 may provide the DCN Type in the TAU Accept. The MME 162 may release the NAS connection for the WTRU 102.

For example, if the WTRU 102 is in connected mode (e.g., already in connected mode), the MME 162 may use a GUTI Reallocation Command procedure to provide the WTRU 102 with a new GUTI. It is contemplated that the MME 162 may provide (e.g., may still provide) the WTRU 102 with the new DCN type as determined by the CN node (e.g., the MME 162). The procedures set forth above may be used for this purpose. The MME 162 may include an indication in the NAS message (e.g., any NAS message, for example, the GUTI Reallocation Command) whether or not the WTRU 102 may or is to trigger a redirection. The indication may also include when the redirection may or is to be done (e.g., a time for initiation of the redirection). For example, the MME 162 may include a time value in the NAS message after which the redirection is to be initiated by the WTRU 102 (or the network 100).

After a new GUTI and/or DCN type has been provided to the WTRU 102 by the MME 162 (as described above), the MME 162 may release the connection of the WTRU 102. The MME 162 may trigger the WTRU Context Release Command and may include an indication that the reason for the release is due to a DCN change and/or due to a desire or need to redirect the WTRU 102 to another CN node 162A/148A, or 162B/148B (or DCN 650A or 650B). The CN node (e.g., the MME 162) may include the new DCN type that may be used for this WTRU 102. The CN node (e.g., the MME 162) may indicate whether or not a redirection is needed/desired, for example, since a new DCN Type may not trigger a redirection. When the RAN node (e.g., the eNB 160) receives an indication (which may include a DCN Type) to release the WTRU's context or an indication that the release is due to a DCN change, the eNB 160 may release the WTRU's connection and may include a new reason for the release of the connection (e.g., a "change in DCN"). The eNB 160 may include a received DCN Type (e.g., from the MME 162) in an RRC message (e.g., an RRC release message or other RRC message).

The MME 162 may send another S1AP message that is not the context release message. The MME 162 may send another S1AP message (e.g., WTRU Context Modification Request) and may include a new DCN Type in the message. The eNB 160 may send a new or existing RRC message to transport (e.g., provide) the new DCN Type to the WTRU 102. At any time, when the DCN changes, the MME 162 may inform the WTRU 102 using any of the procedures and/or methods above. The eNB 160 may update the DCN Type of the WTRU 102 in the context stored by the eNB 160 for the WTRU 102. The eNB 160 may use the DCN Type to determine (e.g., in the determination of or as a factor in the determination of) which target eNBs 160 can be used for handover (e.g., which eNBs 160 are a target for handover). In certain representative embodiments, the eNB 160 may indicate in an RRC message that is sent to the WTRU 102 whether or not a redirection is needed/desired or whether the DCN Type is changed without redirection.

The procedures set forth above may apply when the WTRU 102 transitions to connected mode with any NAS message (e.g., Service Request, Extended Service Request, and/or TAU/RAU, among others).

It is understood by one of skill in the art that the blocks/operations in FIG. 8 may be done in various orders. Moreover, it is understood by one of skill in the art that certain embodiments may include all or a portion (e.g., only a subset) of blocks/operation illustrated in FIG. 8.

Representative Procedures when the WTRU is in Idle Mode

Figure 9:
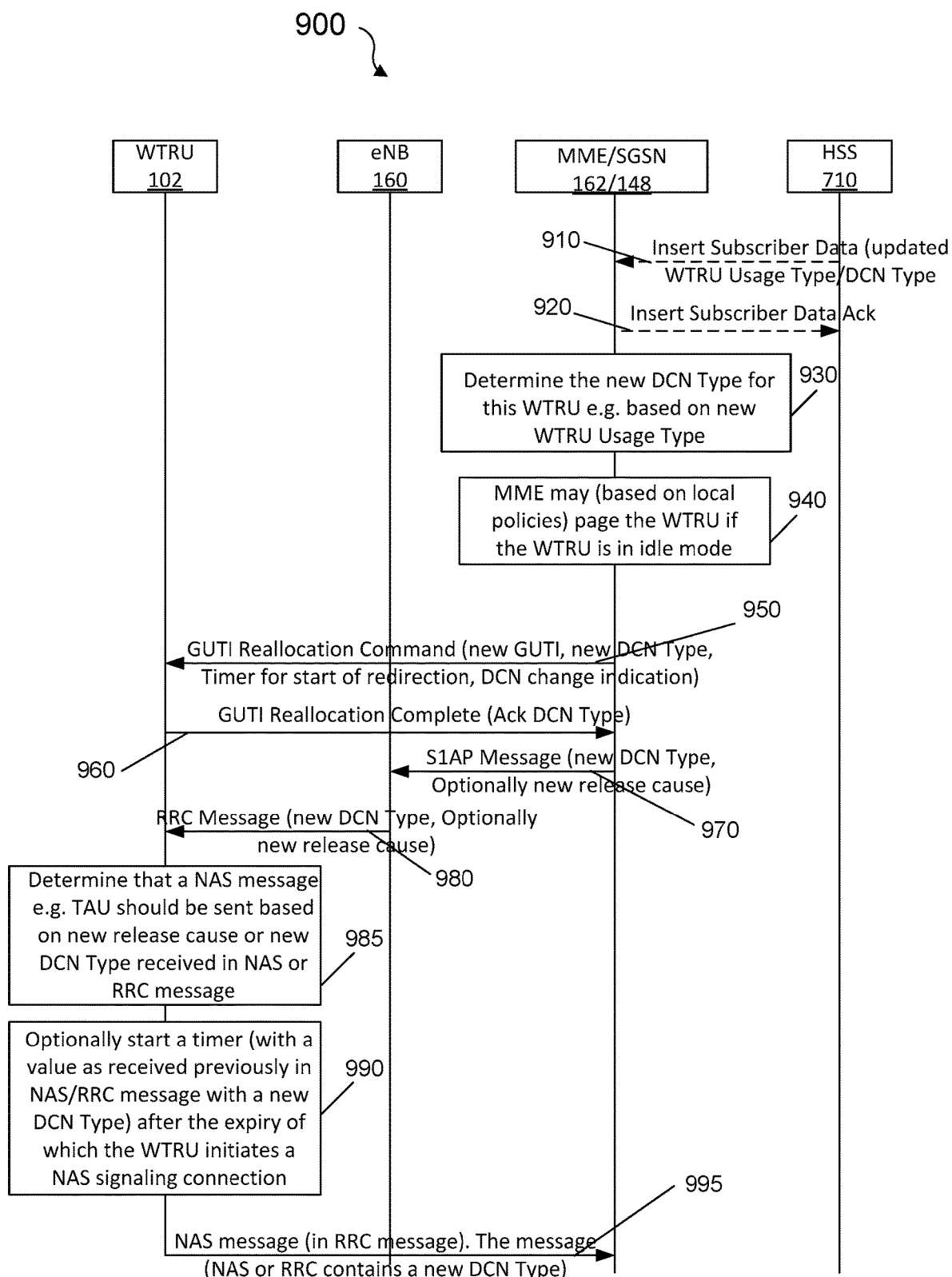
FIG. 9 is a flow diagram illustrating the operations of various entities in the redirection to another CN node.

FIG. 9 is a flow diagram illustrating operations 900 of various entities in the redirection to another CN node.

Referring to FIG. 9, at 910, the HSS 710 may send an Insert Subscriber Data message to a MME 162 and/or SGSN 148 associated with a WTRU 102. At 920, the MME 162 and/or SGSN 148 associated with the WTRU 102 may send an Insert Subscriber Data Acknowledgement message to the HSS 710. At 930, the MME 162 and/or SGSN 148 associated with the WTRU 102 may determine and/or set the new DCN Type for the WTRU 102 (e.g., based on the updated or new WTRU Usage Type/DCN Type in the Insert Subscriber Data message. At 940, the MME 162/SGSN 148 may page the WTRU 102 on condition that the WTRU 102 is in idle mode. At 950, the MME 162/SGSN 148 may send a GUTI Reallocation Command to the WTRU 102 that may include any of: (1) a new GUTI; (2) a new DCN Type; (3) a timer for a start of the redirection; and/or (4) a DCN change indication, among others. At 960, the WTRU 102 may send a GUTI Reallocation Complete message (e.g., which may include an Ack DCN Type indicator) to the MME 162/SGSN 148. At 970, the MME 162/SGSN 148 may send an S1AP Message (e.g., which may include any of: a new DCN Type and/or a new release cause, among others) to the eNB 160. At 980, the eNB 160 may send a message (e.g., an RRC message and/or a NAS message, which may include the new DCN Type and/or the new release cause, among others). At 985, the WTRU 102 may determine that a NAS message (e.g., a TAU message is to be or should be sent based on the new release cause or the new DCN Type received in the NAS message or the RRC message. At 990, the WTRU 102 may start a timer (with a value as received previously in NAS/RRC message with a new DCN Type). After the expiry of the timer, the WTRU 102 may initiate a NAS signaling connection. At 995, the WTRU 102 may send a NAS message, for example in an RRC message such that the NAS or RRC may include the new DCN Type.

Figure 10:
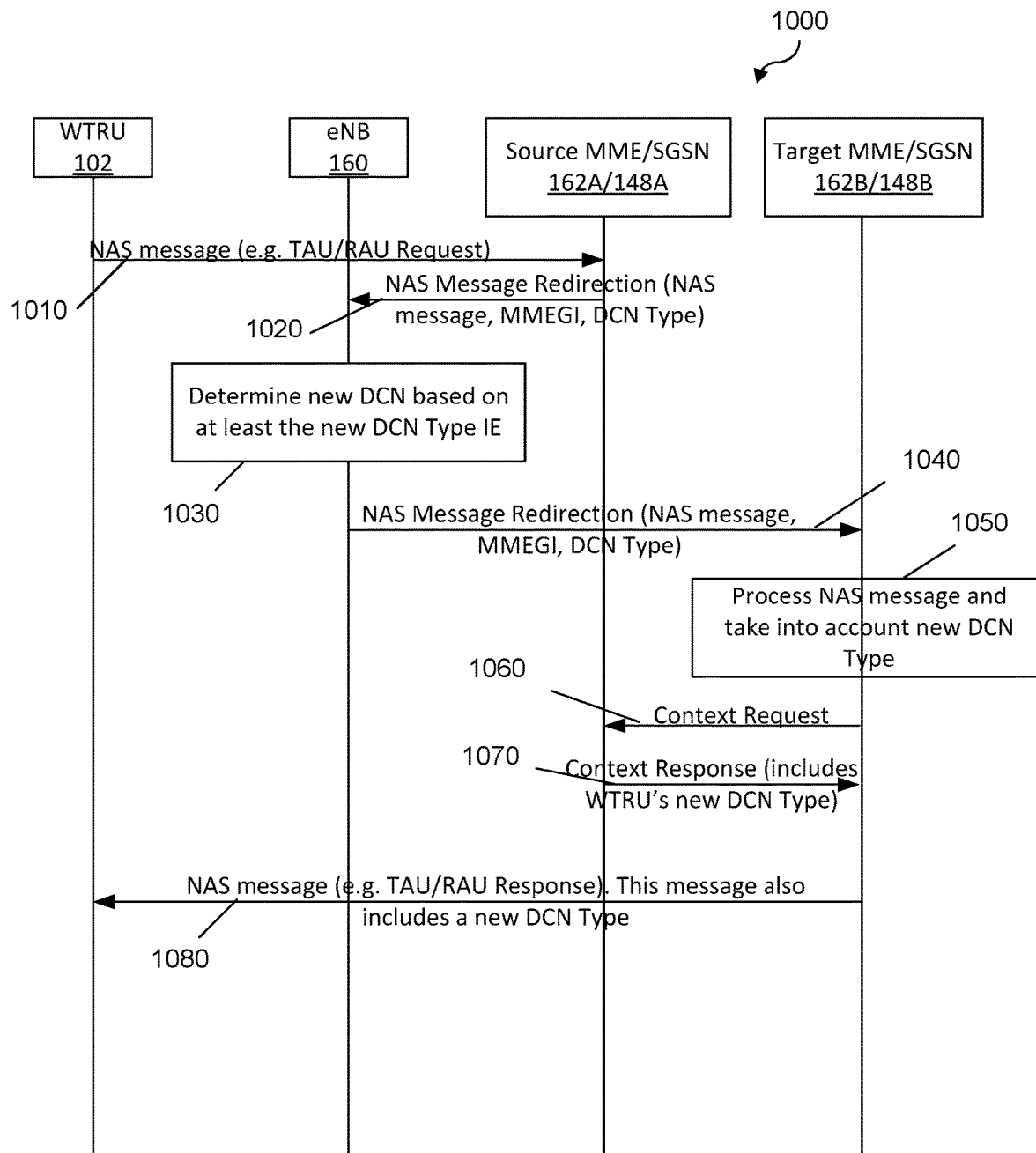
FIG. 10 is a diagram illustrating a NAS message used to initiate a redirection procedure.

FIG. 10 is a diagram illustrating a NAS message (e.g., TAU/RAU Request) 1000 used to initiate a redirection procedure (e.g., from a source MME 162A to a target MME 162B) for a DCN Type WTRU that has changed its DCN Type.

Referring to FIG. 10, at 1010, the WTRU 102 may send a message (e.g., a NAS message, for example, a TAU/RAU Request) to the source MME 162A/SGSN 148A. At 1020, the source MME 162A/SGSN 148 may send to the eNB 160 a redirection message (e.g., a NAS Message Redirection), which may include any of: (1) the NAS message; (2) an MMEGI and/or (3) the DCN Type, among others. At 1030, the eNB 160 may determine the new DCN based on at least the new DCN Type IE. At 1040, the eNB 160 may send to the target MME 162B/SGSN 148B a redirection message (e.g., a NAS Message Redirection), which may include any of: (1) the NAS message; (2) the MMEGI and/or (3) the DCN Type, among others. At 1050, the target MME 162B/SGSN 148B may process the NAS message and may take into account the new DCN Type. At 1060, the target MME 162B/SGSN 148B may send a Context Request to the source MME 162A/SGSN 148A. At 1070, the source MME 162A/SGSN 148A may send a Context Response to the target MME 162B/SGSN 148B, which may include the new DCN Type of the WTRU 102. At 1080, the target MME 162B/SGSN 148B may send a message (e.g., a NAS message, for example a TAU/RAU Response that may include the new DCN Type.

Referring to FIGS. 9 and 10, if the WTRU 102 is in idle mode, the CN node (e.g., the MME 162) may decide or determine to page the WTRU 102 to transition the WTRU 102 (e.g., bring the WTRU 102) to connected mode and to provide the new DCN Type to the WTRU 102. In certain representative embodiments, the CN node (e.g., the MME 162) may redirect the WTRU 102. Once in connected mode, the CN node (e.g., the source MME 162A) may use any of the procedures/operations/methods described herein to provide a new DCN Type to the WTRU 102 and/or to redirect the WTRU 102 to a new target DCN 650B/target CN.

The WTRU 102 may autonomously leave idle mode for mobile originated (MO) data or MO signaling. For example, the WTRU 102 may use the service request procedure to leave idle mode for MO data and/or MO session management signaling. When the WTRU 102 is in connected mode based on a WTRU initiated service request procedure or as a result of WTRU initiated service request procedure, the source CN node (e.g., the MME 162A) may use the procedures/operations/methods described herein to provide the WTRU 102 with a new DCN Type and/or to redirect the WTRU 102 to a new CN or DCN.

If the WTRU 102 transitions out of idle mode using (e.g., with) other NAS messages, such as TAU/RAU/Detach Request, the CN node (e.g., the MME 162A) may provide (e.g., first provide) a DCN Type (e.g., a new DCN Type) to the WTRU 102 (e.g., using any of the procedures/operations/methods herein) or may redirect (e.g., directly redirect) the WTRU 102 to a new target CN 650B and may provide the new DCN Type to the new target CN node (e.g., a new and different MME 162B). To redirect the WTRU 102, the source MME 162A may use new or existing procedures (e.g., the MME 162 may use the NAS Message Redirection procedure). In certain representative embodiments, the source MME 162A may include the new DCN Type of the WTRU 102 as a new information element (IE) in the NAS Message Redirection procedure. Once received by the eNB 160, the eNB 160 may use the new DCN Type received from the source CN node (e.g., the source MME 162) to select (and/or pick) a new target CN node (e.g., target MME 162B. The eNB 160 may use the DCN Type and/or the MMEGI received from the source CN node (e.g., the source MME 162A) to select the new target CN node (e.g., the target MME 162B).

After the NAS message is redirected to the new MME 162 (e.g., the target MME 162B), the target MME 162B may forward the new DCN Type for the WTRU 102 via a NAS message (e.g., TAU/RAU Accept, among others). The source MME 162A may forward any DCN Type IE to the new target MME 162B as part of a context request/response between the source MME 162A and the target MME 162B.

It is understood by one of skill in the art that the blocks/operations in FIGS. 9 and 10 may be done in various orders. Moreover, it is understood by one of skill in the art that certain embodiments may include all or a portion (e.g., only a subset) of the blocks/operations of FIGS. 9 and 10.

Representative WTRU Behavior

A WTRU 102 may receive in NAS and/or RRC messages a new DCN Type IE. If a redirection is to occur (e.g., is needed), the WTRU 102 may receive in the NAS and/or RRC message a timer after expiry of which a redirection may be initiated. If the WTRU 102 receives a new DCN Type IE, the WTRU 102 may override its current DCN Type with the value received in the new DCN Type IE. If a timer is received in the NAS and/or RRC message, the WTRU 102 may start a timer for a DCN redirection. At the expiry of the timer, the WTRU 102 may send a TAU/RAU message and/or any NAS message, for example, for the network to redirect the WTRU 102. The WTRU 102 may include the new DCN Type in the NAS message.

If the WTRU 102 receives an RRC message (e.g., a RRC Connection Release message) with a new DCN Type IE and/or with a new cause code to indicate that the reason for release is a redirection (e.g., "DCN Redirection Required"), the WTRU 102 (e.g., the RRC layer in the WTRU 102) may forward the received IEs (e.g., all received IEs) to higher layers (e.g., to the NAS layer). The RRC layer may forward the received timers (e.g., any timer received) in the RRC release message to higher layers such as the NAS layer or other layers. The NAS may take any actions described herein (e.g., start a timer to determine when the redirection is to occur and/or send a NAS message after the timer expires such that the new DCN Type may be included in the NAS message).

Representative Blocking Procedure of the WTRU at the RRC Level in RAN

Figure 11:
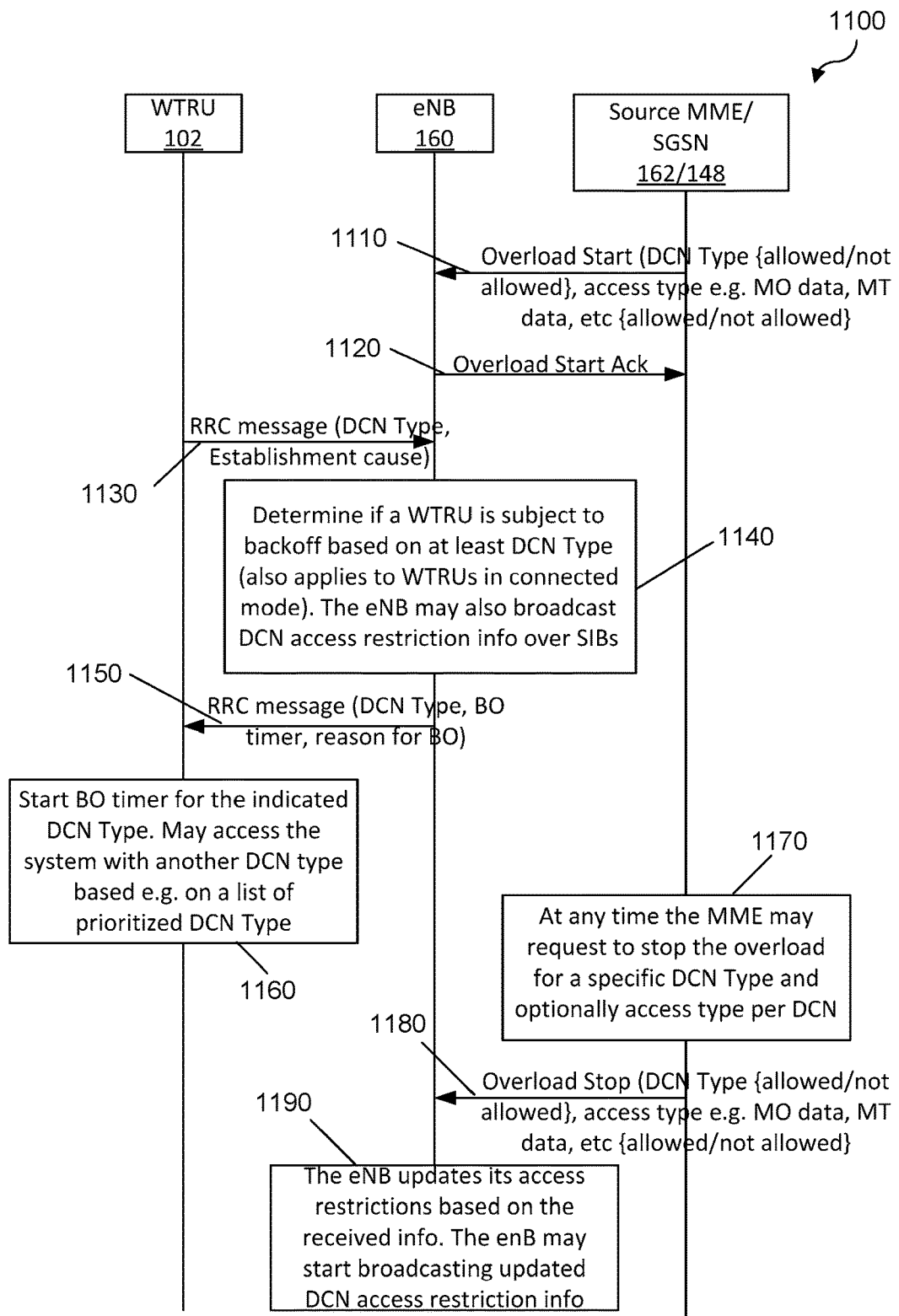
FIG. 11 is a diagram illustrating a representative blocking procedure.

FIG. 11 is a diagram illustrating a representative blocking procedure 1100. Referring to FIG. 11, at 1110, the source MME 162/SGSN 148 may send to a RAN node (e.g., the eNB 160) an Overload Start message which may include any of: (1) an indicator indicating whether the DCN Type is allowed or not allowed (e.g., DCN Type {allowed/not allowed}; and/or (2) an indicator indicating whether an access type is allowed or not allowed (e.g., an access type (e.g., MO data, MT data, etc {allowed/not allowed}, among others. At 1120, the RAN node (e.g., the eNB 160) may send to the source MME 162/SGSN 148 an Overload Start Ack message. At 1130, the WTRU 102 may send to the RAN node (e.g., the eNB 160) a message (e.g., an RRC message including any of: (1) the DCN Type and/or (2) the Establishment cause, among others). At 1140, the eNB 160 may determine if the WTRU 102 is subject to backoff based on at least DCN Type (e.g., for either the WTRU 102 in idle mode or in connected mode). The eNB 160 may broadcast DCN access restriction info over one or more SIBs. At 1150, the eNB 160 may send a message (e.g., an RRC message), which may include any of: (1) the DCN Type; (2) a Backoff (BO) timer; and/or (3) a reason for the BO, among others. At 1160, the WTRU 102 may: (1) start the BO timer for the indicated DCN Type; and/or (2) access the system with another DCN type based, for example, on a list of prioritized DCN Types, among others. At 1170, the source MME 162/SGSN 148, at any time, may request to stop the overload for a specific DCN Type and/or for an access type per DCN 650. At 1180, the source MME 162/SGSN 148 may send a message (e.g., an Overload Stop), which may include the any of: (1) an indicator indicating whether the DCN Type is allowed or not allowed (e.g., DCN Type {allowed/not allowed}); and/or (2) an indicator indicating whether an access type is allowed or not allowed (e.g., an access type (e.g., MO data, MT data, etc {allowed/not allowed}, among others. At 1190, the eNB 160 may update eNB access restrictions based on the received info (e.g., information). The eNB 160 may start broadcasting updated DCN access restriction info (e.g., information).

For example, when one or more congestion criterion reach (e.g., meet or exceed) one or more thresholds at the DCN 650 (for example based on policies/rules), the CN node (e.g., MME 162/SGSN 148) may send an Overload Start message to the eNB 160 over the S1 interface and may inform the eNB 160 that access for certain DCN Types is blocked or is to be blocked. The eNB 160 may store the information and may reject a RRC Connection Request message (e.g., any RRC Connection Request messages) from the WTRUs 102 that indicate a DCN Type for which congestion control is to be applied or for which congestion control is active/requested. The MME 162 may provide at least one DCN Type in the Overload Start message and the eNB 160 may reject (e.g., block) connections from WTRUs 102 that provide any of the non-allowed/blocked DCN Types received from the CN node (e.g., the MME 162) by the eNB 160. The CN node (e.g., the MME 162) may provide a time during which the overload control is applicable and may provide a time that is used to determine for how long the WTRU 102 with the non-allowed (or blocked) DCN Type is to be blocked (e.g., may be backed off) by the eNB 160.

The eNB 160 may provide a Backoff Timer (e.g., which may be received from the MME 162) to the WTRU 102 so that the WTRU 102 may not re-attempt another connection establishment. It is contemplated that the WTRU 102 may indicate its DCN Type in any RRC message (e.g., the RRC Connection Request message, among others). In certain representative embodiments, the WTRU 102 may indicate its DCN Type in an RRC Connection Setup Complete message, and the eNB 160 may release the RRC Connection and may provide a Backoff timer to the WTRU 102. Under certain congestion levels (e.g., severe congestion situations which exceed a high threshold), the network operator may wish or determine to block access for all DCN Types. In certain representative embodiments, the WTRU 102 may not be able to send the DCN Type in the RRC Connection request message such that the network (e.g., MME 162/eNB 160) may first send a RRC Connection Setup message to the WTRU 102 and may receive a RRC Connection Setup Complete message from the WTRU 102 followed up by a release of the RRC Connection.

In other representative embodiments, the network may inform the WTRUs 102 that the WTRUs 102 may use a new RRC message (e.g., refer to as a DCN Connection Request), if the device is a DCN candidate. When the eNB 160 receives the new DCN Connect Request message, the eNB 160 may know and/or may determine that the connection request is for a DCN Type WTRU and may reject or accept the connection based on at least the information that the WTRU 102 is a DCN Type WTRU and/or the eNB 160 may provide a backoff timer, as appropriate.

In certain representative embodiments, the network may inform the WTRU 102 about its capability of decoding/understanding the new RRC message (e.g., the DCN Connection Request message), for example, because the WTRU 102 may not otherwise be sure whether or not the network supports the message. One of the System Information Blocks (SIBs) may be modified to carry this information (for example, a one-bit or multi-bit indicator indicating the capability to decode a DCN Connection Request). In other representative embodiments, the RAN 103, 104 and 105 may inform the WTRU 102 of its capability in the first connection establishment, for example, by using a RRC Connection Setup message. An information element (IE) in the RRC Connection Setup message may notify the WTRU 102 of the network support for DCN Type WTRUs.

In other representative embodiments, the NAS messages may be used during the first Attach/TAU procedure. The eNB 160 may broadcast, in any of the SIBs, one of: (1) which DCN Types are not allowed for access; or (2) which DCN Types are allowed for access by WTRUs 102.

The DCN 650A (e.g., via the MME 162A) may determine or want to block certain types of connections associated to certain DCN Types. For instance, the DCN 650A may desire to block (e.g., only block) MO Signaling/Data attempt for DCN 650A. The DCN 650A may provide this blocking information regarding DCN 650A to the RAN 103, 104 and 105 along with the backoff timer (e.g., or other backoff mechanism). The CN node (e.g., the source MME 162A) in the Overload Start message may provide a list of DCN Types that are no longer allowed for access. For each DCN Type, the source MME 162A may indicate if certain types of traffic are allowed or if certain type of traffic are not allowed (e.g., MO Signaling allowed or not allowed, and/or MO Data allowed or not allowed, among others). When an eNB 160 receives an RRC message from the WTRU 102, the eNB 160 may verify the DCN Type indicated by the WTRU 102 and/or the establishment cause. The eNB 160 may determine, based on the information received from the source MME 162A, whether the WTRU's access can be allowed (e.g., based on DCN Type and the reason for access). The reasons for access may include, but are not limited to, mobile terminated data; and or mobile originating data, among others.

If the WTRU 102 is already in connected mode and the context of the WTRU 102 in the eNB 160 indicates that the DCN Type is subject to load control, the eNB 160 may release the connection of the WTRU 102 and may indicate a BO timer, a DCN Type, and/or a reason which may indicate that the cause of the release is congestion for the indicated DCN Type.

The WTRU 102 may be configured to operate or use more than one DCN Type, for example, with a priority set among the DCN Types based on one or more priority rules/policies. With a plurality of DCN Types per WTRU, the WTRU 102 may, for example, request registration in another DCN 650B on condition that the WTRU 102 is not allowed to register (e.g., due to the ongoing congestion in the network in a certain DCN 650A). The WTRU 102 may start (e.g., normally start) with a highest priority DCN Type (according to the priority rules). If the WTRU 102 gets a rejection from the RAN 103, 104 and 105, the WTRU 102 may attempt to access another DCN type that has a lower priority in the list of WTRUs 102 of prioritized DCN 650A and 650B. The WTRU 102 may receive the list of prioritized DCNs 650A and 650B from the CN 106, 107 and/or 109: (1) in a NAS message (e.g., any NAS message), (2) via OMA DM, and/or (3) via SMS, among others, and/or the information can be configured in the WTRU 102.

If the WTRU 102 receives an RRC reject or release with a backoff timer, the WTRU 102 (e.g., the RRC layer) may forward the BO timer to a higher (e.g., NAS) layer. The NAS may start the BO timer associated with the DCN 650A (e.g., during which no access to this DCN 650A may be permitted by the WTRU 102). The WTRU 102 may access the network/system with another DCN Type.

A WTRU 102 may read the SIBs and receive DCN access restriction information (e.g., info) and may determine whether or not the WTRU 102 may access the network/system based on the received info and/or the DCN Type with which it is configured to operate.

It is understood by one of skill in the art that the blocks/operations in FIG. 11 may be done in various orders. Moreover, it is understood by one of skill in the art that certain embodiments may include all or a portion (e.g., only a subset) of blocks/operations illustrated in FIG. 11.

Figure 12:
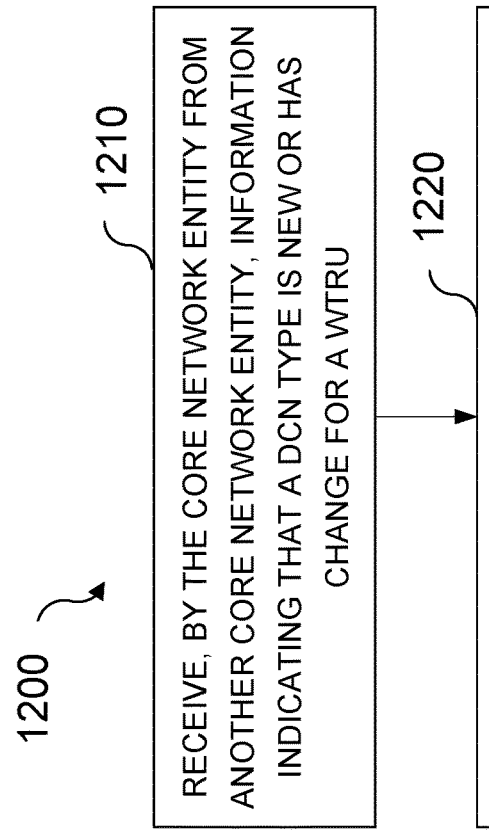
FIG. 12 is a flowchart illustrating a representative method implemented by a CN entity.

FIG. 12 is a flowchart illustrating a representative method implemented by a CN entity, for example, a MME and/or a SGSN.

Referring to FIG. 12, the representative method 1200 may include, at 1210, a CN entity (e.g., the MME 162 or the SGSN 148 receiving from another CN entity (e.g., an HSS 710) information indicating that a DCN type is new or has change for a WTRU 102. At 1220, the CN entity 162/148 may send a message (e.g., an RRC and/or NAS message) to the WTRU 102 that may include the new or the changed DCN type.

In certain representative embodiments, the CN entity 162/148 may determine that the DCN type is new or has changed based on subscription information from the other CN entity 710.

In certain representative embodiments, the CN entity 162/148 may send a GUTI/P-TMSI Reallocation Command that may include the new or the changed DCN type. For example, the CN entity 162/148, on condition that the WTRU 102 is in idle mode, may page the WTRU 102 prior to sending the GUTI/P-TMSI Reallocation Command that includes the new or the changed DCN type.

In certain representative embodiments, the CN entity 162/148 may receive from the WTRU 102 a TAU Request.

For example a CN entity 162A/148A and 162B/148B may include a processor 118; and a transmit/receive unit 120, in communication with the processor 118, and may be configured to: receive, from another CN entity 710, information indicating that a DCN type is new or has change for a WTRU 102; and send a message, to the WTRU 102, including the new or the changed DCN type.

Figure 13:
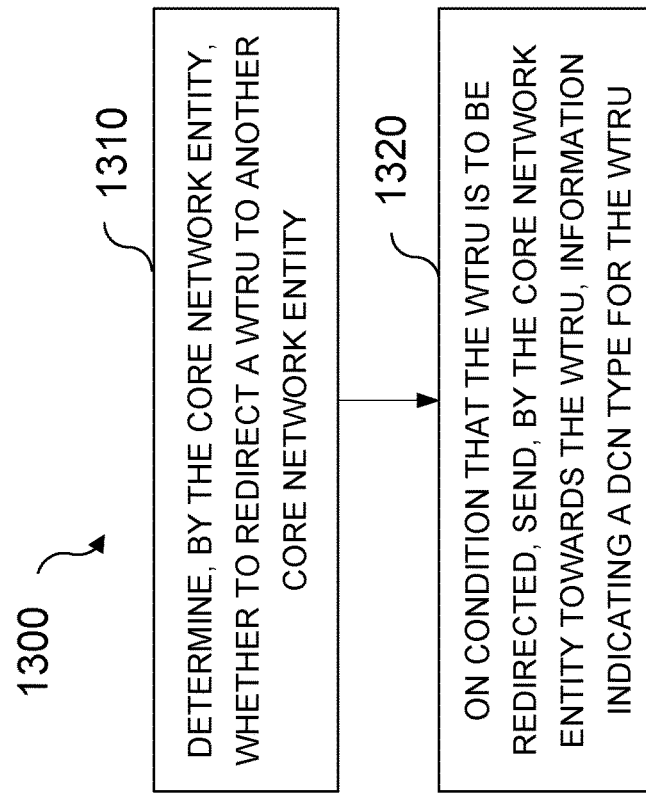
FIG. 13 is a flowchart illustrating another representative method implemented by a CN entity.

FIG. 13 is a flowchart illustrating another representative method implemented by a CN entity.

Referring to FIG. 13, the representative method 1300 may include, at 1310, a CN entity (e.g., the MME 162 or the SGSN 148) determining whether to redirect a WTRU 102 to another CN entity ((e.g., the MME 162A/162B or the SGSN 148A/148B). At 1320, the CN entity (e.g., the MME 162 or the SGSN 148), on condition that the WTRU 102 is to be redirected, may send towards the WTRU 102 information indicating a DCN type for the WTRU 102.

In certain representative embodiments, the CN entity 162/148 may receive subscription information associated with the WTRU 102 including the DCN type of the WTRU 102.

In certain representative embodiments, the CN entity 162/148 may determine whether the WTRU 102 is to be served by the CN entity 162/148 or the other CN entity 162A/148A and 162B/148B based on the DCN type from the received subscription information.

In certain representative embodiments, the CN entity 162/148 may initiate a redirection of the WTRU 102 to the other CN entity 162A/148A and 162B/148B on condition that the WTRU 102 is to be served by the other CN entity 162A/148A and 162B/148B.

For example, the CN entity 162/148 may include a processor 118 configured to determine whether to redirect a WTRU 102 to another CN entity 162A/148A and 162B/148B and a transmit/receive unit 120, in communication with the processor 118, and on condition that the WTRU is to be redirected, configured to send towards the WTRU 102, information indicating a DCN type for the WTRU 102.

Figure 14:
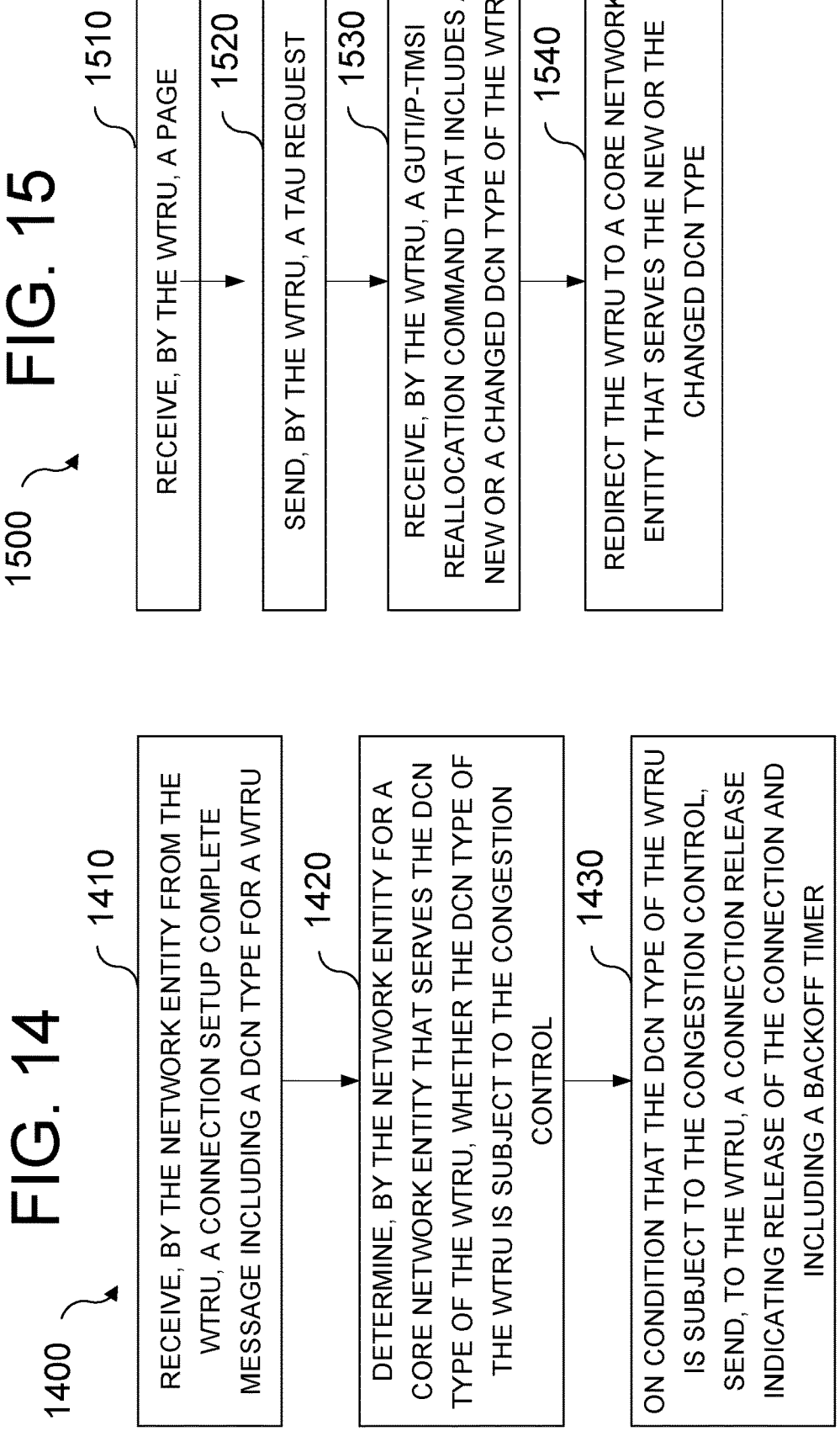
FIG. 14 is a flowchart illustrating a representative method implemented by a network entity.

FIG. 14 is a flowchart illustrating a representative method implemented by a network entity.

Referring to FIG. 14, the representative method 1400 may include, at 1410, a network entity (e.g., an eNB 160, a RAN node 610 and/or an access point, among others) receiving from the WTRU 102, a message (e.g., a Connection Setup Complete message) including a DCN type for a WTRU 102. At 1420, the network entity 160 and 610 may determine for a CN entity 162A/148A and 162B/148B that serves the DCN type of the WTRU 102, whether the DCN type of the WTRU 102 is subject to the congestion control. At 1430, the network entity 160 and 610, on condition that the DCN type of the WTRU 102 is subject to the congestion control, may send, to the WTRU 102, a message (e.g., a Connection Release message) that may indicate release of the connection and may include a backoff timer. For example, the network entity 160 and 610 may determine whether the DCN type of the WTRU 102 is subject to the congestion control based on the DCN type and a congestion level associated with the CN entity 162A/148A and 162B/148B that serves the DCN type of the WTRU 102.

In certain representative embodiments, the network entity 160 and 610 may receive information indicating an overload condition for the CN entity 162A/148A and 162B/148B including an indication of one of more DCN types to be subject to congestion control.

For example, the network entity 160 and 610 may include a transmit/receive unit 120 configured to receive, from a WTRU 102, a Connection Setup Complete message including a DCN type for the WTRU 102 and a processor 118 configured to determine for a CN entity 162A/148A and 162B/148B that serves the DCN type of the WTRU 102, whether the DCN type of the WTRU 102 is subject to the congestion control. In certain representative embodiments, on condition that the DCN type of the WTRU 102 is subject to the congestion control, the transmit/receive unit 120 may be configured to send, to the WTRU 102, a message (e.g., a Connection Release message) indicating release of the connection and including a backoff timer.

Figure 15:
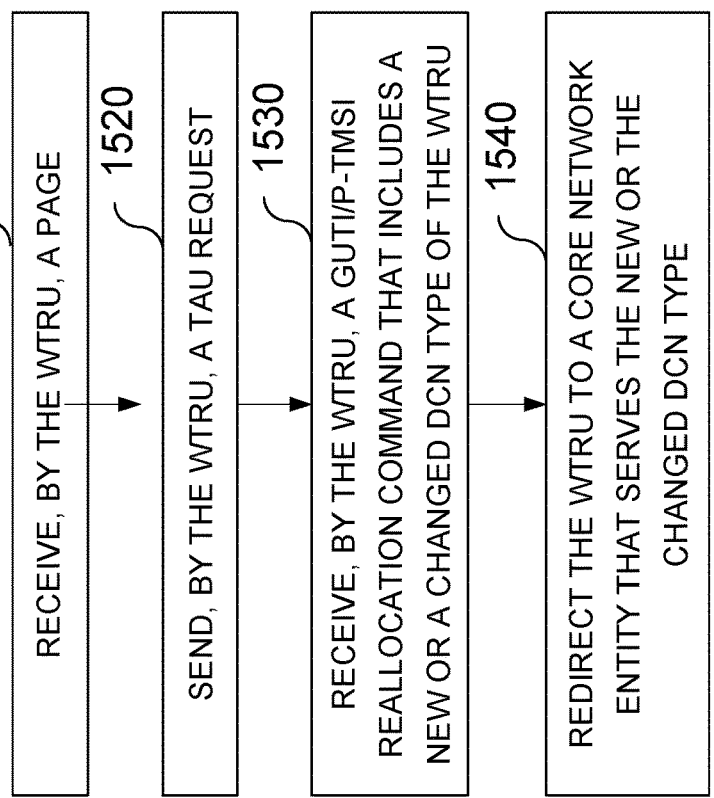
FIG. 15 is a flowchart illustrating a representative method implemented by a WTRU.

FIG. 15 is a flowchart illustrating a representative method implemented by a WTRU in idle mode (e.g., initially in idle mode).

Referring to FIG. 15, the representative method 1500 may include, at 1510, a WTRU 102 receiving a page. At 1520, the WTRU 102 may send a TAU Request. At 1530, the WTRU 102 may receive a GUTI/P-TMSI Reallocation Command that may include a new or a changed DCN type of the WTRU 102 At 1540, the WTRU 102 may redirect to a CN entity 162A/148A and 162B/148B that serves the new or the changed DCN type.

For example, the WTRU 102 in idle mode may include a transmit/receive unit 120 configured to: receive a page, send a TAU Request, and receive a GUTI/P-TMSI Reallocation Command that may include a new or a changed DCN type of the WTRU; and a processor 118 configured to redirect the WTRU 102 to a CN entity 162A/148A and 162B/148B that serves the new or the changed DCN type.

FIG. 16 is a flowchart illustrating another representative method implemented by a WTRU.

Referring to FIG. 16, the representative method 1600 may include, at 1610, a WTRU 102 sending a request message (e.g., a Connection Request message) to a network entity 160 and 610. At 1620, the WTRU 102 may receive from the network entity 160 and 610 a setup message (e.g., a Connection Setup message). At 1630, the WTRU 102 may send to the network entity 160 and 610, a setup complete message (e.g., a Connection Setup Complete message) that may include a DCN type for the WTRU 102. At 1640, on condition that the DCN type of the WTRU is subject to the congestion control by a CN: the WTRU 102, may receive from the network entity 160 and 610 a message (e.g., a Connection Release message) that may indicate release of a connection and may include a backoff timer, and may wait for expiration of the backoff timer before resending the request message (e.g., the Connection Request message) to the network entity 160 and 610.

For example, the WTRU 102 may include a transmit/receive unit 120 and a processor 118. The transmit/receive unit 120 may be configured to: send a Connection Request to a network entity 160 and 610, receive, from the network entity 160 and 610, a Connection Setup message, send, to the network entity 160 and 610, a Connection Setup Complete message that may include a DCN type for the WTRU 102, and on condition that the DCN type of the WTRU 102 is subject to the congestion control by a CN 650A and 650B, receive, from the network entity 160 and 610, a Connection Release indicating release of a connection and including a backoff timer. The processor 118 may be configured to wait for expiration of the backoff timer and the transmit/receive unit 120 may be configured to resend the Connection Request to the network entity after the expiration of the backoff timer.

FIG. 17 is a flowchart illustrating a further representative method implemented by a network entity and/or a CN entity.

Referring to FIG. 17, the representative method 1700 may include, at 1710, a network entity 160 and/or a CN entity 162/148 receiving a DCN type for a WTRU with a connection request from the WTRU 102. At 1720, the network entity 160 and/or the CN entity 162/148 may determine whether the CN entity 162/148 or another CN entity 162A/148A and 162B/148B that may serve the DCN type of the WTRU 102 is congested, as a determined result. At 1730, responsive to the determined result, the network entity 160 and/or the CN entity 162/148 may send information indicating acceptance or rejection of the connection request. For example, the network entity 160 and/or the CN entity 162/148 may send the information indicating acceptance of the connection request based on a determination that the CN entity 162/148 or the other CN entity 162A/148A and 162B/148B that serves the DCN type of the WTRU 102 is not congested. As another example, the CN entity 162/148 may send the information indicating rejection of the connection request based on a determination that the CN entity 162/148 or the other CN entity 162A/148A and 162B/148B that serves the DCN type of the WTRU 102 is congested.

In certain representative embodiments, the network entity 160 and/or the CN entity 162/148 may determine whether the CN entity 162/148 or the other CN entity 162A/148A and 162B/148B that serves the DCN type of the WTRU 102 is congested based on one or more operating parameters associated with the CN entity 162/148 or the other CN entity 162A/148A and 162B/148B that serves the DCN type of the WTRU 102 excessing one or more respective thresholds.

FIG. 18 is a flowchart illustrating a further representative method implemented by a WTRU.

Referring to FIG. 18, the representative method 1800 may include, at 1810, a WTRU 102 sending to a network entity 160 and 610, a contention-based connection request message including information indicating a DCN type for the WTRU 102. The DCN type may indicate a type of WTRU 102 which is server by or is to be served by a DCN entity 162A/148a and 162B/148B associated with the WTRU 102 that is requesting a connection to a network. At 1820, the WTRU 102 may receive from the network entity 160 and 610, a connection completion message in accordance with the request for the connection to the network and may indicate at least a set of resources for non-contention based communication.

In certain representative embodiments, the WTRU 102 may receive a broadcast message including an indicator that may indicate whether or not the network supports DCN type messages. For example, the WTRU 102 may determine to send the contention-based connection request message that includes the DCN type based on reception of the broadcast message which indicates support for the DCN type messages.

FIG. 19 is a flowchart illustrating an additional representative method implemented by a WTRU for managing a connection to a network.

Referring to FIG. 19, the representative method 1900 may include, at 1910, a WTRU 102 receiving a broadcast message including an indicator indicating whether or not the network supports DCN type messages. At 1920, the WTRU 102 may determine whether to send a contention-based connection request message that may include the DCN type based on the indicator in the broadcast message. At 1930, the WTRU 102 may send to a network entity 160 and 610, a first contention-based connection request message which does not include a DCN type on condition that the network does not support DCN type messages or a second contention-based connection request message which does include a DCN type on condition that the network does support DCN type messages.

FIG. 20 is a flowchart illustrating an additional representative method implemented by a network entity of a network.

Referring to FIG. 20, the representative method 2000 may include, at 2010, a network entity 160 and 610 receiving from a WTRU 102 a contention-based connection request message that may include information indicating a DCN type for the WTRU 102. The DCN type may indicate a type of WTRU 102 which is to be served by a DCN entity 162A/148A associated with the WTRU 102 that is requesting a connection to the network. At 2020, the network entity 160 and 610 may determine whether to accept or reject the connection request based on at least the DCN type in the contention-based connection request message. At 2030, on condition that the connection request is accepted, the network entity 160 and 610 may redirect the WTRU to another DCN entity 162B/148B that is to serve or serves WTRUs 102 of the DCN type included in the received connection request message. At 2040, on condition that the connection request is rejected, the network entity 160 and 610 may sending to the WTRU 102, a connection reject message and a backoff timer that may indicate a period of time in which the WTRU 102 cannot connect to the network served by the CN entity that is associated with the DCN type in the connection request message.

In certain representative embodiments, the network 100 may support a plurality of DCN types per WTRU 102.

In certain representative embodiments, on condition that the connection request is rejected, the network entity 160 and 610 may receive from the WTRU 102, another contention-based connection request message including information indicating a second, different DCN type for the WTRU 102. For example, the second DCN type may indicate a type of WTRU which is to be served by a further network entity associated with the WTRU 102 that is requesting a second connection to the network 100.

In certain representative embodiments, the network entity 160 and 610 may determine whether to accept or reject the second connection request based on at least the second DCN type in the other contention-based connection request message.

In certain representative embodiments, on condition that the other connection request is accepted, the network entity 160 and 610 may redirect the WTRU 102 to the further network entity the serves WTRUs 102 of the DCN type included in the received second connection request message.

In certain representative embodiments, the network entity 160 and 610 may send a broadcast message that may include an indicator indicating whether or not the network supports DCN type messages.

In certain representative embodiments, the network entity 160 and 610 may determine whether the contention-based connection request message includes or does not include information indicating the DCN type for the WTRU 102.

FIG. 21 is a flowchart illustrating a further representative method implemented by a network entity.

Referring to FIG. 21, the representative method 2100 may include, at 2110, a network entity 160 and 610 receiving a contention-based connection request message that may include information indicating a DCN type for the WTRU 102. The DCN type may indicate a type of WTRU 102, which is served by or is to be served by a DCN entity 162A/148A associated with the WTRU 102 that is requesting a connection to the network 100. At 2120, the network entity 160 and 610 may determine whether to accept or reject the connection request based on at least the DCN type in the contention-based connection request message. At 2130, on condition that the connection request is accepted, the network entity 160 and 610 may send to the WTRU 102, a connection completion message in accordance with the request for the connection and indicating at least a set of resources for non-contention based communication.

FIG. 22 is a flowchart illustrating a still further representative method implemented by a network entity.

Referring to FIG. 22, the representative method 2200 may include, at 2210, a network entity 160 and 610 receiving from a WTRU 102, a DCN type for the WTRU 102 with a connection request. At 2220, the network entity 160 and 610 may determine whether to block the WTRU 102 from connecting to a CN entity 162A that serves the DCN type of the WTRU, as a determined result. At 2230, responsive to the determination result, the network entity 160 and 610 may send information indicating acceptance or rejection of the connection request. For example, the network entity 160 and 610 may send information indicating acceptance of the connection request based on a determination that the WTRU is not to be blocked from connecting to the CN entity 162 that serves the DCN type of the WTRU 102 and may send information indicating rejection of the connection request based on a determination that the WTRU is to be blocked from connecting to the CN entity 162 that serves the DCN type of the WTRU 102.

In certain representative embodiments, the network entity 160 and 610 may establish one or more access rules based on DCN type and/or establishment causes; and may compare the DCN type and establishment causes associated with the WTRU 102 with the established access rules to determine whether to block the WTRU from connecting to the CN entity 162A/148A that serves the DCN type of the WTRU 102.

It is contemplated that the CN entity may be any of: (1) a source MME; and/or (2) a target MME. It is also contemplated that a CN entity and/or a network entity may include one or more processors, one or more memories, and/or a one or more transmit/receive units to perform any of the operation disclosed herein for such entities.

It is contemplated that the embodiments described herein apply to other devices/systems such as GERAN/UTRAN or any new systems such as that developed for Cellular Internet of Things Although LTE specific NAS messages and RRC messages and S1AP messages are shown, the equivalent messages in these other systems can be used, as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, MME or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method, implemented by a Network Entity (NE), the method comprising:
   receiving, by the NE from a Wireless Transmit/Receive Unit (WTRU), a Service Request (SR) to change the WTRU to connected mode;
   sending, by the NE to the WTRU, information indicating (1) a new or a changed type of network portion associated with a service to serve the WTRU, (2) one or more candidate network portions associated with the service, and (3) that at least one of the one or more candidate network portions that are associated with the service is rejected;
   sending, by the NE, a Connection Release message; and
   receiving, by the NE, a registration request, wherein the registration request includes information indicating a request for a first network portion associated with the service to serve the WTRU, on condition that the first network portion is not rejected.

2. The method of claim 1, further comprising sending, by the NE, a paging message prior to sending the information.

3. The method of claim 1, further comprising:
   sending, by the NE, a value for a timer.

4. The method of claim 1, wherein the registration request is a non-access stratum (NAS) message.

5. The method of claim 1, wherein:
   the new or changed type of network portion associated with the service to serve the WTRU is sent in a command, and
   the command is a non-access stratum (NAS) message.

6. The method of claim 5, further comprising:
   sending, by the NE with the command, timing information indicating a time to redirect to the first network portion to serve the WTRU.

7. The method of claim 1, wherein the information included in the registration request indicates that a registration is to be completed.

8. The method of claim 1, wherein:
   the sending of the Connection Release message includes sending a value for a backoff timer; and
   the Connection Release message indicates release of a connection with a previous network portion.

9. The method of claim 1, wherein the registration request includes an indication of a request for a second, different network portion associated with the service to serve the WTRU, on condition that the first network portion is rejected.

10. A Network Entity (NE), comprising:
    a transmit/receive unit configured to:
       receive a Service Request (SR) to change a Wireless Transmit/Receive Unit (WTRU) to connected mode;
       send information indicating (1) a new or a changed type of network portion associated with a service to serve the WTRU, (2) one or more candidate network portions associated with the service, and (3) that at least one of the one or more candidate network portions that are associated with the service is rejected;
       send a Connection Release message; and
       receive a registration request,
       wherein on condition that the first network portion associated with the service is not rejected, the registration request includes information indicating a request for the first network portion associated with the service to serve the WTRU.

11. The NE of claim 10, wherein the transmit/receive unit is configured to send a paging message prior to transmission of the information.

12. The NE of claim 10, wherein:
the transmit/receive unit is configured to send a value for a timer.

13. The NE of claim 10, wherein the registration request is a non-access stratum (NAS) message.

14. The NE of claim 10, wherein the Connection Release message includes a value for a backoff timer, and indicates release of a connection to a previous network portion.

15. The NE of claim 10, wherein:
the new or changed type of network portion associated with the service to serve the WTRU is sent in a command; and
the command is a non-access stratum (NAS) message.

16. The NE of claim 15, wherein timing information indicating a time to redirect to the first network portion to serve the WTRU is sent with the command to control timing of a redirection of the WTRU to the first network portion to serve the WTRU in accordance with the timing information.

17. The NE of claim 10, wherein the information included in the registration request indicates that a registration is to be completed.

18. The NE of claim 10 wherein the registration request includes an indication of a request for a second, different network portion associated with the service to serve the WTRU, on condition that the first network portion is rejected.

\* \* \* \* \*

UNITED STATES PATENT AND TRADEMARK OFFICE
CERTIFICATE OF CORRECTION

PATENT NO. : 11,689,979 B2
APPLICATION NO. : 17/343270
DATED : June 27, 2023
INVENTOR(S) : Mahmoud Watfa and Behrouz Aghili It is certified that error appears in the above-identified patent and that said Letters Patent is hereby corrected as shown below:

In the Specification

Column 23, Line 34: Delete "and or", insert --and/or--
Column 27, Line 3: Delete "148a", insert --148A--
Column 29, Line 10: Delete "Things", insert --Things.--
Column 33, Line 35: Delete "¶6", insert --¶ 6--

Signed and Sealed this
Sixteenth Day of July, 2024

Katherine Kelly Vidal
*Director of the United States Patent and Trademark Office*